United States Patent [19]
Yamauchi et al.

[11] Patent Number: 6,136,892
[45] Date of Patent: *Oct. 24, 2000

[54] FLAME RETARDANT RESIN COMPOSITION

[75] Inventors: Kouji Yamauchi; Hideo Matsuoka, both of Aichi; Hideki Matsumoto, Nagoya; Toshihide Inoue, Aichi, all of Japan

[73] Assignee: Toray Industries, Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/060,495

[22] Filed: Apr. 15, 1998

Related U.S. Application Data

[63] Continuation of application No. 08/948,139, Oct. 9, 1997, Pat. No. 5,965,639.

[30] Foreign Application Priority Data

| Oct. 16, 1996 | [JP] | Japan | ................................ 8-273801 |
| Dec. 24, 1996 | [JP] | Japan | ................................ 8-344325 |
| Dec. 26, 1996 | [JP] | Japan | ................................ 8-348950 |
| Apr. 25, 1997 | [JP] | Japan | ................................ 9-109898 |
| Apr. 25, 1997 | [JP] | Japan | ................................ 9-109899 |
| Apr. 30, 1997 | [JP] | Japan | ................................ 9-112398 |

[51] Int. Cl.$^7$ .............................. C08K 9/00; C08K 5/34; C08K 3/32
[52] U.S. Cl. .......................... 523/206; 524/80; 524/101; 524/414
[58] Field of Search ............................ 524/80, 101, 414; 523/206

[56] References Cited

U.S. PATENT DOCUMENTS

| 4,102,853 | 7/1978 | Kawamura et al. .................... 524/425 |
| 4,220,735 | 9/1980 | Diek et al. ................................ 525/90 |
| 4,393,153 | 7/1983 | Hepp ....................................... 523/201 |
| 5,731,390 | 3/1998 | Helmond ................................ 524/442 |

FOREIGN PATENT DOCUMENTS

| 6-299050 | 10/1994 | Japan . |
| 5-339 493 | 12/1994 | Japan . |
| 8-176450 | 7/1996 | Japan . |
| 1 577 587 | 10/1980 | United Kingdom . |

*Primary Examiner*—Kriellion Sanders
*Attorney, Agent, or Firm*—Austin R. Miller

[57] ABSTRACT

A flame retardant resin composition including 100 parts by weight of component (A) or (B) and 0.01 to 30 parts by weight of red phosphorus (C) shows excellent flame retardancy even if the molding obtained from it is thin, and is excellent in mechanical properties, wet heat resistance and electric properties, being suitable for mechanical parts, electric and electronic parts, automobile parts, and housings and other parts of office automation apparatuses and household electric appliances. Component (A) may be a thermoplastic resin polyethylene terephthalate and ethylene terephthalate copolymers, and polyethylene terephthalate and/or ethylene terephthalate copolymer, and component (B) may be a thermoplastic resin selected from

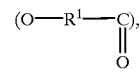

, $(O-R^2-O)$, $(O-CH_2CH_2-O)$ and

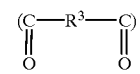

wherein $R^1$, $R^2$, and $R^3$ are divalent aromatic residues.

24 Claims, No Drawings

FLAME RETARDANT RESIN COMPOSITION

This application is a con of Ser. No. 08/948,139 filed Oct. 9, 1997, now U.S. Pat. No. 5,965,639.

BACKGROUND OF THE INVENTION

The present invention relates to a flame retardant resin composition adopting a non-halogen based flame retardant agent. In more detail, it relates to a flame retardant resin composition excellent in flame retardancy, mechanical properties, wet heat resistance and electric properties and suitable for mechanical parts, electric and electronic parts, automobile parts, housings and other parts of office automation apparatuses, household electric appliances, etc.

Thermoplastic resins such as polyester resins, polyamide resins and ABS resins are being used as injection molded materials in a wide range of fields such as mechanical parts, electric and electronic parts, automobile parts, office automation apparatuses and household electric appliances because of their excellent properties. On the other hand, these thermoplastic resins are inherently combustible, and when they are used as industrial materials, they are often required to be safe against flames, i.e., flame retardant, in addition to being well balanced in physical properties. Especially as for flame retardancy, in recent years, since moldings are reduced in weight and size, hence also in thickness, thin moldings are required to be highly flame retardant.

Thermoplastic resins are generally made flame retardant by compounding a halogen based organic compound as a flame retardant agent and an antimony compound as a flame retardation assistant into the resin. However, this method tends to evolve a large amount of smoke at the time of burning.

So in recent years, it has been strongly desired to use a flame retarding agent free from any halogen based compound.

For making a thermoplastic resin flame retardant without using any halogen based flame retardant agent, it is widely known to add a hydrated metal compound such as aluminum hydroxide or magnesium hydroxide, but to achieve satisfactory flame retardancy, the hydrated metal compound must be added in such a large amount as to degrade the properties peculiar to the resin disadvantageously.

On the other hand, as a method for making a combustible resin flame retardant without using such a hydrated metal compound, the use of red phosphorus is disclosed in Japanese Patent Laid-Open (Kokai) Nos. 60-168758, 61-219706, 63-89567, 1-129061, 2-169666, 3-197553, 6-9887, 6-145504, 6-263983, etc. However, though these patent gazettes disclose a flame retarding method of adding red phosphorus to a combustible resin, for example, adding red phosphorus to PET, they do not describe at all about the use of PET and/or (co)PET for making a combustible resin flame retardant, the use of PET/(co)PET/red phosphorus as a flame retardant agent of a combustible resin, or a combination of a liquid crystal polyester with a specific structure and red phosphorus. Furthermore, though the resin compositions obtained by these methods show excellent flame retardancy when the moldings obtained from them are thick (1/16″), they are not sufficient in flame retardancy disadvantageously when the moldings obtained from them are thin (1/32″), contrary to the demand in recent years for resins. Furthermore, these resin compositions have such problems that they are lowered in mechanical properties because of the flame retardant agent contained, and that the flame retardant agent bleeds out during dry heat or wet heat treatment, to contaminate the electric contacts of connectors.

SUMMARY OF THE INVENTION

The object of the present invention is to provide a flame retardant resin composition containing a non-halogen based flame retardant agent, which is highly flame retardant irrespective of whether it is molded into a thick product (1/16″) or thin product (1/32″), excellent in mechanical properties, wet heat resistance, impact resistance and electric properties, and suitable for mechanical parts, electric and electronic parts, automobile parts, and housings and other parts of office automation apparatuses and household electric appliances.

The present invention has the following constitution:

(1) A flame retardant resin composition, comprising 100 parts by weight of the following component (A) or (B) and 0.01 to 30 parts by weight of red phosphorus (C): (A) (a1) 67 to 99.99 wt % (based on the total weight of (a1) and (a2)) of a thermoplastic resin other than polyethylene terephthalate and ethylene terephthalate copolymers and (a2) 33 to 0.01 wt % (based on the total weight of (a1) and (a2)) of polyethylene terephthalate and/or an ethylene terephthalate copolymer (B) a thermoplastic resin consisting of the following structural components (I), (II), (III) and (IV):

[Chemical formula 5]

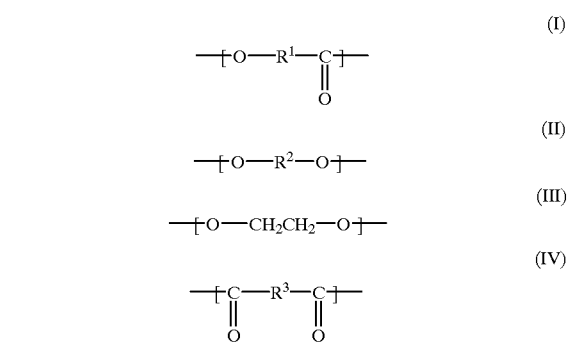

(where R1, R2 and R3 stand for, respectively independently, a divalent aromatic residue.)

(2) A flame retardant resin composition, comprising (a1) 100 parts by weight of a thermoplastic resin other than polyethylene terephthalate and ethylene terephthalate copolymers, (a2) 0.01 to 50 parts by weight of polyethylene terephthalate and/or an ethylene terephthalate copolymer, and (C) 0.1 to 30 parts by weight of red phosphorus. (3) A flame retardant resin composition, comprising 100 parts by weight of a thermoplastic resin (B) consisting of the following structural components (I), (II), (III) and (IV) and 0.01 to 10 parts by weight of red phosphorus (C).

[Chemical formula 6]

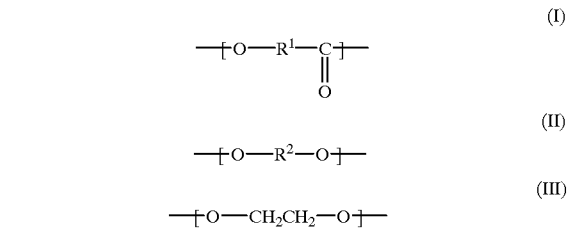

-continued

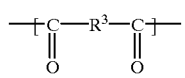
(IV)

(where R1, R2 and R3 stand for, respectively independently, a divalent aromatic residue.)

(4) A flame retardant resin composition, as stated in the above (3), wherein the thermoplastic resin (B) contains the structural components (I) and (II) by 77 to 93 mol % in total based on the total amount of the structural components (I), (II) and (III), the structural component (III) by 23 to 7 mol % based on the total amount of the structural components (I), (II) and (III), and the structural component (IV) by an amount substantially equal in moles to the total amount of the structural components (II) and (III).

(5) A flame retardant resin composition, as stated in the above (1), wherein the thermoplastic resin (a1) other than polyethylene terephthalate and ethylene terephthalate copolymers is polybutylene terephthalate.

(6) A flame retardant resin composition, as stated in the above (1), wherein the thermoplastic resin (a1) other than polyethylene terephthalate and ethylene terephthalate copolymers is a polyamide.

(7) A flame retardant resin composition, as stated in the above (6), wherein the polyamide is one or more selected from nylon 6, nylon 66 and their copolymer.

(8) A flame retardant resin composition, as stated in the above (1), wherein the thermoplastic resin (a1) other than polyethylene terephthalate and ethylene terephthalate copolymers is a styrene based resin.

(9) A flame retardant resin composition, as stated in the above (1), wherein red phosphorus is covered with a thermosetting resin.

(10) A flame retardant resin composition, as stated in the above (1), wherein the electric conductivity of red phosphorus is 0.1 to 1000 $\mu$s/cm. (The electric conductivity refers to the electric conductivity of the extract obtained by adding 100 ml of pure water to 5 g of red phosphorus, treating the mixture at 121° C. for 100 hours, filtering away red phosphorus, and diluting the filtrate to 250 ml.)

(11) A flame retardant resin composition, as stated in the above (1), wherein a metal oxide is further contained.

(12) A flame retardant resin composition, as stated in the above (11), wherein the metal oxide is one or more selected from cadmium oxide, zinc oxide, cuprous oxide, cupric oxide, ferrous oxide, ferric oxide, cobalt oxide, manganese oxide, molybdenum oxide, tin oxide and titanium oxide.

(13) A flame retardant resin composition, as stated in the above (12), wherein the metal oxide is cuprous oxide, cupric oxide or titanium oxide.

(14) A flame retardant resin composition, as stated in the above (1), wherein a filler is further contained.

(15) A flame retardant resin composition, as stated in the above (14), wherein the filler is glass fibers.

(16) A flame retardant resin composition, as stated in the above (1), wherein a fluorine based resin is further contained.

(17) A flame retardant resin composition, as stated in the above (1), wherein a hindered phenol based stabilizer is further contained.

(18) A flame retardant resin composition, as stated in the above (1), wherein a salt formed by a triazine based compound and cyanuric acid or isocyanuric acid is further contained.

(19) A molding, comprising a flame retardant resin composition consisting of 100 parts by weight of the following component (A) or (B) and 0.01 to 30 parts by weight of red phosphorus (C): (A) (a1) 67 to 99.99 wt % (based on the total weight of (a1) and (a2)) of a thermoplastic resin other than polyethylene terephthalate and ethylene terephthalate copolymers and (a2) 33 to 0.01 wt % (based on the total weight of (a1) and (a2)) of polyethylene terephthalate and/or an ethylene terephthalate copolymer (B) a thermoplastic resin consisting of the following structural components (I), (II), (III) and (IV):

[Chemical formula 3]

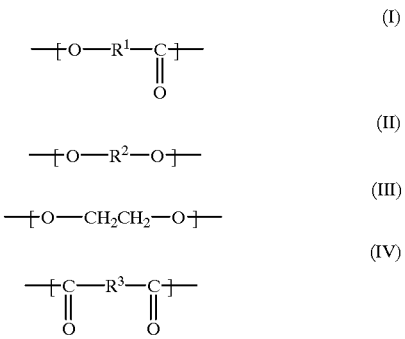

(where R1, R2 and R3 stand for, respectively independently, a divalent aromatic residue.)

(20) A molding, as stated in the above (19), wherein the molding is selected from mechanical parts, electric and electronic parts, automobile parts, office automation apparatus housings, household electric appliance housings, office automation apparatus parts, and household electric appliance parts.

(21) A process for producing a flame retardant resin composition, comprising the steps of melt-kneading part of the following component (A) or (B) and red phosphorus (C), to produce a composition high in red phosphorus content (1), and melt-kneading the remaining amount of the component (A) or (B) and the composition high in red phosphorus content (1) by a double-screw extruder:

(A) (a1) 67 to 99.99 wt % (based on the total weight of (a1) and (a2)) of a thermoplastic resin other than polyethylene terephthalate and ethylene terephthalate copolymers and (a2) 33 to 0.01 wt % (based on the total weight of (a1) and (a2)) of polyethylene terephthalate and/or an ethylene terephthalate copolymer.

(B) a thermoplastic resin consisting of the following structural components (I), (II), (III) and (IV):

[Chemical formula 4]

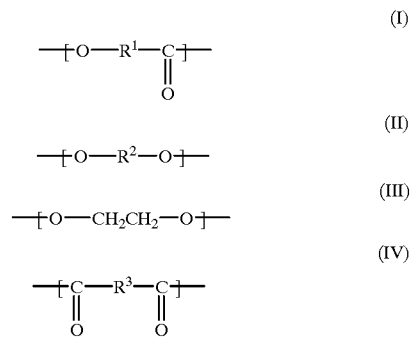

(where R1, R2, and R3 stand for, respectively independently, a divalent aromatic residue).

(22) A flame retardant agent for resins, comprising (a2) 100 parts by weight of polyethylene terephthalate and/or an ethylene terephthalate copolymer and (C) 0.01 to 250 parts by weight of red phosphorus.

PREFERRED EMBODIMENT OF THE INVENTION

The flame retardant resin composition of the present invention comprises 100 parts by weight of the following component (A) or (B) and 0.01 to 30 parts by weight of red phosphorus (C):

(A) (a1) 67 to 99.99 wt % (based on the total weight of (a1) and (a2)) of a thermoplastic resin other than polyethylene terephthalate and ethylene terephthalate copolymers and (a2) 33 to 0.01 wt % (based on the total weight of (a1) and (a2)) of polyethylene terephthalate and/or an ethylene terephthalate copolymer.

(B) a thermoplastic resin consisting of the following structural components (I), (II), (III) and (IV):
[Chemical formula 9]

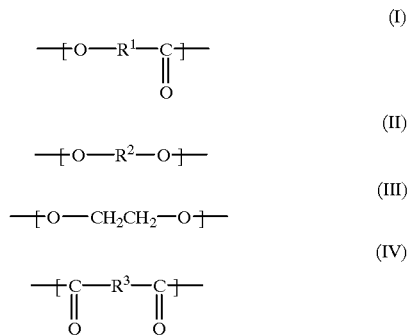

(where R1, R2 and R3 stand for, respectively independently, a divalent aromatic residue.)

The component (A) of the flame retardant resin composition of the present invention is described below.

The component (A) of the present invention consists of (a1) a thermoplastic resin other than polyethylene terephthalate and ethylene terephthalate copolymers and (a2) polyethylene terephthalate and/or an ethylene terephthalate copolymer.

The thermoplastic resin (a1) other than polyethylene terephthalate and ethylene terephthalate copolymers of the present invention refers to a synthetic thermoplastic resin other than polyethylene terephthalate and ethylene terephthalate copolymers, which becomes flowable when heated and can be molded because of the flowability. The thermoplastic resins which can be used here include, for example, non-liquid crystal polyester resins other than polyethylene terephthalate are ethylene terephthalate copolymers, liquid crystal polyester resins, polycarbonate resins, polyamide resins, polyphenylene oxide resin, polyphenylene sulfide resin, polyoxymethylene resin, phenoxy resin, polyolefin based resins such as polypropylene resin and polyethylene resin, ethylene/propylene resin, ethylene/1-butene resin, ethylene/propylene/nonconjugated diene resin, ethylene/ethyl acrylate resin, ethylene/glycidyl methacrylate resin, ethylene/vinyl acetate/glycidyl methacrylate resin, ethylene/vinyl acetate/glycidyl methacrylate resin, ethylene/propylene-g-maleic anhydride resin, styrene based resins such as polystyrene resin, styrene/acrylonitrile copolymer and acrylonitrile/butadiene/styrene copolymer (ABS resin), elastomers such as polyester polyether elastomers and polyester polyester elastomers, and mixtures of two of more of these thermoplastic resins. Among them, one or more as a mixture selected from nonliquid crystal polyester resins other than polyethylene terephthalate and ethylene terephthalate copolymers, liquid crystal polyester resins, polyamide resins, polycarbonate resins, phenoxy resin, polyphenylene sulfide resin, phenol resin, polyoxymethylene resin, and polystyrene based resins such as polystyrene resin, styrene/acrylonitrile copolymer and acrylonitrile/butadiene/styrene copolymer (ABS resin) are preferable. Among them, one or more as a mixture selected from non-liquid crystal polyester resins other than polyethylene terephthalate and ethylene terephthalate copolymers, liquid crystal polyester resins, polyamide resins, polyphenylene sulfide resin, polyoxymethylene resin, and polystyrene based resins such as polystyrene resin, styrene/acrylonitrile copolymer and acrylonitrile/butadiene/styrene copolymer (ABS resin) are more preferable. Among them, non-liquid crystal polyester resins other than polyethylene terephthalate and ethylene terephthalate copolymers, liquid crystal polyester resins, polyamide resins, and polystyrene based resins such as polystyrene resin, styrene/acrylonitrile copolymer and acrylonitrile/butadiene/styrene copolymer (ABS resin) are especially preferable.

Among the above thermoplastic resins (a1) other than polyethylene terephthalate and ethylene terephthalate copolymers, the non-liquid crystal polyester resins other than polyethylene terephthalate and ethylene terephthalate copolymers include, substantially, polycondensation products of dicarboxylic acids and glycols, ring opened polymers of cyclic lactones, polycondensation products of hydroxycarboxylic acids, polycondensation products of dibasic acids and glycols, etc., concretely polybutylene terephthalate resin, polyethylene naphthalate resin, polybutylene naphthalate resin, polycyclohexanedimethylene terephthalate resin, polyethylene-1,2-bis (phenoxy) ethane-4,4'-dicarboxylate resin, and also copolymers such as polyethylene isophthalate/terephthalate resin, polybutylene terephthalate/isophthalate resin, polybutylene terephthalate/decanedicarboxylate resin and polycyclohexanedimethylene terephthalate/isophthalate resin, and their mixtures. A polyester resin especially suitable for the present invention is polybutylene terephthalate resin.

The molecular weight of such a polyester resin is not especially limited, but a polyester resin of 0.10 to 3.00 dl/g, preferably 0.25 to 2.50 dl/g, more preferably 0.40 to 2.25 dl/g in the intrinsic viscosity measured at 25° C. using a 1:1 mixed solvent of phenol/tetrachloroethane can be used.

Among the thermoplastic resins (a1) other than polyethylene terephthalate and ethylene terephthalate copolymers, the polyamide resins include ring opened polymers of cyclic lactams, polycondensation products of aminocarboxylic acids, polycondensation products of dibasic acids and diamines, etc., concretely aliphatic polyamides such as nylon 6, nylon 66, nylon 46, nylon 610, nylon 612, nylon 11 and nylon 12, aliphatic-aromatic polyamides such as poly(metaxylene adipamide) (hereinafter abbreviated as MDX·6), poly(hexamethylene terephthalamide (hereinafter abbreviated as 6T), poly(hexamethylene isophthalamide) (hereinafter abbreviated as 6I) and poly(tetramethylene isophthalamide) (hereinafter abbreviated as 4I), their copolymers and mixtures. Polyamides especially suitable for the present invention include nylon 6, nylon 66, nylon 6/66 copolymer and nylon 66/6T copolymer.

The molecular weight of such a polyamide resin is not especially limited, but a polyamide resin of 1.70 to 4.50, preferably 2.00 to 4.00, more preferably 2.00 to 3.50 in the relative viscosity measured at a concentration of 1% in 98% sulfuric acid at 25° C. can be used.

Among the thermoplastic resins (a1) other than polyethylene terephthalate and ethylene terephthalate copolymers, the styrene based resins include polystyrene, styrene/acrylonitrile copolymer, rubber modified styrene based resins, polymer blends consisting of a rubber modified styrene based resin and polyphenylene ether, etc.

Among them, a rubber modified styrene based resin refers to a graft polymer with a rubbery polymer dispersed as fine grains in a matrix made of an aromatic vinyl polymer, and it can be obtained by publicly known bulk polymerization, bulk suspension polymerization, solution polymerization or emulsion polymerization of an aromatic vinyl monomer or as required, a monomer mixture consisting of an aromatic vinyl monomer and a copolymerizable vinyl monomer in the presence of a rubbery polymer.

The rubber modified styrene based resins which can be used here include, for example, impact resistant polystyrene, ABS resin (acrylonitrile-butadiene-styrene copolymer), AAS (acrylonitrile-acrylic rubber-styrene copolymer), AES resin (acrylonitrile-ethylene propylene rubber-styrene copolymer), etc.

The rubber modified styrene based resins include a structure in which a (co)polymer containing styrene monomer is grafted to a rubbery polymer and a structure in which a (co)polymer containing styrene monomer is non-grafted to a rubbery polymer.

The polyethylene terephthalate and/or an ethylene terephthalate copolymer (a2) used in the present invention refers to a thermoplastic polyester consisting of terephthalic acid as an acid component and ethylene glycol as a glycol component. In addition, isophthalic acid, orthophthalic acid, naphthalenedicarboxylic acid, oxalic acid, adipic acid or 1,4-cyclohexanedicarboxylic acid, etc. can also be used partially as a copolymerized acid component, and propylene glycol, 1,4-butanediol, 1,6-hexanediol, 1,4-cyclohexanedimethanol or ethylene oxide addition product of bisphenol A, etc. can also be used partially as a copolymerized glycol component. Among them, a polyethylene terephthalate copolymer with terephthalic acid as a dicarboxylic acid component and ethylene glycol and cylohexanedimethanol as glycol components can be preferably used.

When any of other components as described above is copolymerized, the amount of the copolymerized component is not especially limited as far as the effect of the present invention is not significantly impaired. When a dicarboxylic acid or a glycol is used as a copolymerized component, the amount of the dicarboxylic acid or glycol is preferably 40 mol % or less, more preferably 30 mol % or less, further more preferably 25 mol % or less, especially preferably 20 mol % or less based on the total moles of the dicarboxylic acids or the total moles of the glycols.

The polyethylene terephthalate and/or an ethylene terephthalate copolymer (a2) used in the present invention is preferably 0.25 to 3.00 dl/g, more preferably 0.40 to 2.25 dl/g in the intrinsic viscosity measured at 25° C. using a 1:1 mixed solvent of phenol/tetrachloroethane.

The amount of the polyethylene terephthalate and/or ethylene terephthalate copolymer (a2) added in the present invention is 33 to 0.01 wt %, preferably 23 to 0.1 wt %, more preferably 23 to 4.76 wt %, further more preferably 23 to 9.1 wt % based on the total amount of the thermoplastic resin (a1) other than polyethylene terephthalate and ethylene terephthalate copolymers and the polyethylene terephthalate and/or ethylene terephthalate copolymer (a2) (based on the total amount of (a1) and (a2)).

That is, the amount of polyethylene terephthalate and/or an ethylene terephthalate copolymer (a2) added is 0.01 to 50 parts by weight, preferably 0.1 to 30 parts by weight, more preferably 5 to 30 parts by weight, further more preferably 10 to 30 parts by weight, especially preferably 15 to 30 parts by weight against 100 parts by weight of the thermoplastic resin (a1) other than polyethylene terephthalate and ethylene terephthalate copolymers.

Especially when the thermoplastic resin (a1) other than polyethylene terephthalate and ethylene terephthalate copolymers is polybutylene terephthalate resin, the amount of polyethylene terephthalate and/or an ethylene terephthalate copolymer (a2) added is 0.1 to 50 parts by weight, preferably 0.5 to 45 parts by weight, more preferably 1 to 43 parts by weight, further more preferably 2 to 40 parts by weight, especially preferably 5 to 35 parts by weight against 100 parts by weight of polybutylene terephthalate (a1), in view the compatibility between (a1) and (a2), the flame retardancy and wet heat resistance of the resin composition and the bleeding of the flame retardant agent.

When the thermoplastic resin (a1) other than polyethylene terephthalate and ethylene terephthalate copolymers is a polyamide resin, the amount of polyethylene terephthalate and/or an ethylene terephthalate copolymer (a2) is C.1 to 50 parts by weight, preferably 0.1 to 30 parts by weight, more preferably 2 to. 27 parts by weight, further more preferably 5 to 25 parts by weight against 100 parts by weight of the polyamide resin (a1) in view of the compatibility between (a1) and (a2), the flame retardancy and electric properties of the resin composition and the bleeding of the flame retardant agent.

Furthermore, the effects of the present invention appear when if (a1) is polybutylene terephthalate, the amount of polyethylene terephthalate and/or an ethylene terephthalate copolymer (a2) to be added is up to 68 parts by weight, wherein the method of compounding and the condition of dispersing of the red phosphorus and the terephthalate component (a2) are good.

Accordingly, when the thermoplastic resin (a1) other than polyethylene terephthalate and/or an ethylene terephthalate copolymer is polybutylene terephthalate and the method of compounding and the condition of dispersing of the red phosphorus and the component (a2) are good, the amount of polyethylene terephthalate and/or an ethylene terephthalate copolymer (a2) added is 0.1 to 68 parts by weight, preferably 0.1 to 50 parts by weight, more preferably 0.5 to 45 parts by weight, further more preferably 1 to 43 parts by weight, especially preferably 2 to 40 parts by weight, more especially preferably 5 to 35 parts by weight against 100 parts by weight of polybutylene terephthalate (a1), in view of the compatibility between (a1) and (a2), the flame retardancy and wet heat resistance of the resin composition and the bleeding of the flame retardant agent.

When the thermoplastic resin (a1) other than polyethylene terephthalate and ethylene terephthalate copolymers is a styrene based resin, the amount of polyethylene terephthalate and/or an ethylene terephthalate copolymer (a2) added is 0.1 to 50 parts by weight, preferably 1 to 50 parts by weight, more preferably 1 to 45 parts by weight, further more preferably 1 to 40 parts by weight against 100 parts by weight of the styrene based resin (a1) in view of the compatibility between (a1) and (a2), the flame retardancy of the resin composition, the bleeding of the flame retardant agent and impact resistance. The polyethylene terephthalate and/or ethylene terephthalate copolymer (a2) used in this case is preferably an ethylene terephthalate copolymer in view of the compatibility between (a1) and (a2), the flame retardancy and impact resistance of the resin composition and the bleeding of the flame retardant agent.

In the present invention, it has been found that if a thermoplastic resin with a specific structure expressed by the component (B) and red phosphorus (C) are used together, flame retardancy can be secured by using a specifically small amount of red phosphorus, and that a flame retardant resin composition excellent in coloration resistance, heat resistance and flowability can be obtained.

The component (B) of the present invention is a thermoplastic resin consisting of the following structural components (I) (II), (III) and (IV), i.e., a liquid crystal polyester.
[Chemical formula 10)

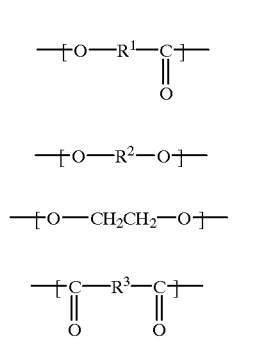

(where R1, R2 and R3 stand for, respectively independently, a divalent aromatic residue.)

The liquid crystal polyester represented by the above formulae (I) through (IV) is described below concretely.

Said structural component (I) is a structural component produced from an aromatic hydroxycarboxylic acid. The structural component (II) is a structural component produced from an aromatic diol. The structural component (III) is a structural component produced from ethylene glycol. The structural component (IV) is a structural component produced from an aromatic dicarboxylic acid.

In the above, the hydroxycarboxylic acid can be one or more selected from 4,4'-hydroxybiphenylcarboxylic acid, p-hydroxybenzoic acid, 2,6-hydroxynaphthalenecarboxylic acid, t-butyl substitution product of p-hydroxybenzoic acid, 3,3',5,5'-tetramethyl-4,4'-hydroxybiphenylcarboxylic acid, phenyl substitution product of p-hydroxybenzoic acid, etc., The aromatic diol can be one or more selected from 4,4'-dihydroxybiphenyl, hydroquinone, 2,6-dihydroxynaphthalene, t-butylhydroquinone, 3,3', 5,5'-tetramethyl-4,4'-dihydroxybiphenyl, phenylhydroquinone, etc. The aromatic dicarboxylic acid can be one or more selected from terephthalic acid, 4,4'-diphenylcarboxylic acid, 2,6-naphthalenedicarboxylic acid, 1,2-bis(phenoxy) ethane-4,4'-dicarboxylic acid, 1,2-bis(2-chlorophenoxy) ethane-4,4'dicarboxylic acid, etc.

In the above formulae, R1 can stand for
[Chemical formula 11],

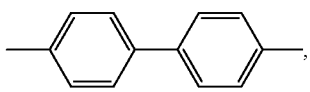

-continued (structures shown)

R2 can stand for
[Chemical formula 12], and (structures shown)

R3 can stand for
[Chemical formula 13]

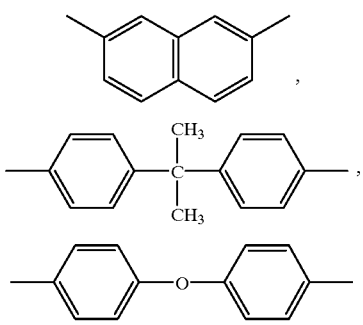

-continued

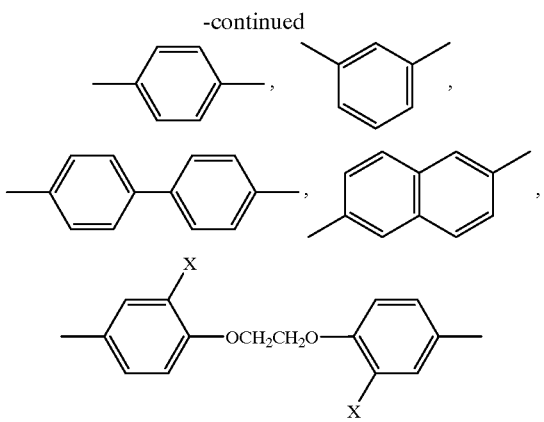

(where X stands for a hydrogen atom or chlorine atom.)
In the above, it is most preferable that
R1 stands for
[Chemical formula 14]

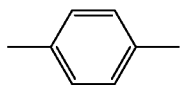

R2 stands for
[Chemical formula 15], and

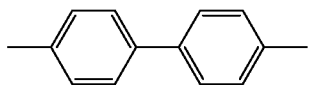

R3 stands for
[Chemical formula 16]

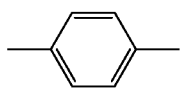

in view of flame retardancy, coloration resistance, heat resistance and flowability.

The component (B) preferably used in the present invention is a copolymer consisting of the above structural components (I), (II), (III) and (IV), and the copolymerized amounts of the structural components (I), (II), (III) and (IV) are preferably as described below.

The total amount of the structural components (I) and (II) is preferably 77 to 93 mol %, more preferably 75 to 90 mol % based on the total amount of the structural components (I), (II) and (III). The amount of the structural component (III) is preferably 23 to 7 mol %, more preferably 23 to 7 mol % based on the total amount of the structural components (I), (II) and (III). If the total amount of the structural components (I) and (II) is too large in the total amount of the structural components (I), (II) and (III), the flowability tends to decline, and as the case may be, solidification may occur during polymerization. If the amount is too small, the heat resistance tends to be poor, and the flame retardancy of the polymer itself also tends to decline. The molar ratio of the structural components (I) and (II), i.e., [(I)/(II)] is preferably 75/25 to 95/5, more preferably 78/22 to 93/7 in view of heat resistance and flowability.

In addition to said structural components (I) through (IV), an aromatic dicarboxylic acid such as 3,3'-diphenyldicarboxylic acid or 2,2'-diphenyldicarboxylic acid, an aliphatic dicarboxylic acid such as adipic acid, azelaic acid, sebacic acid or dodecanedionic acid, an alicyclic dicarboxylic acid such as hexahydroterephthalic acid, an aromatic diol such as chlorohydroquinone, 3,4'-dihydroxybiphenyl, 4,4'-dihyroxydiphenylsulfone, 4,4'-dihydroxydiphenyl sulfide, 4,4'-dihydroxybenzophenone or 3,4'-dihydroxybiphenyl, an aliphatic or alicyclic diol such as 1,4-butanediol, 1,6-hexanediol, neopentyl glycol, 1,4-cyclohexanediol or 1,4-cyclohexanedimethanol, an aromatic hydroxycarboxylic acid such as m-hydroxybenzoic acid or 2-hydroxy-6-naphtoic acid, or p-aminophenol, p-aminobenzoic acid, etc. can be copolymerized by such a small amount as not to impair the object of the present invention.

The method for producing the component (B) used in the present invention is not especially limited, and any of publicly known polyester polycondensation methods can be applied.

For example, the following methods can be preferably used for producing the component (B).

(1) A diacylation product of an aromatic dihydroxy compound such as p-acetoxybenzoic acid, 4,4'-diacetoxybiphenyl or diacetoxybenzene, an aromatic dicarboxylic acid such as terephthalic acid, and a polymer or oligomer of a polyester such as polyethylene terephthalate or bis(β-hydroxyethyl) ester of an aromatic dicarboxylic acid such as bis(β-hydroxyethyl) terephthalate are subjected to polycondensation reaction to remove acetic acid, for producing the component (B).

(2) An aromatic hydroxycarboxylic acid such as p-hydroxybenzoic acid or 2-hydroxy-6-naphthoic acid, an aromatic dihydroxy compound such as 4,4'-dihyroxybiphenyl or hydroquinone, an aromatic dicarboxylic acid such as terephthalic acid, isophthalic acid or 2,6-napthalenedicarboxylic acid, a polymer or oligomer of a polyester such as polyethylene terephthalate or bis(βhydroxyethyl) ester of an aromatic dicarboxylic acid such as bis(βhydroxyethyl) terephthalate are subjected to polycondensation reaction to remove acetic acid, in the presence of acetic anhydride as a hydroxy group acylating agent, for producing the component (B).

These polycondensation reactions occur even without any catalyst, but a publicly known polycondensation catalyst for crystalline resins such as potassium acetate, sodium acetate, stannous acetate, tetrabutyl titanate or antimony trioxide can be used.

The melt viscosity of the crystalline resin used in the present invention is preferably 10 to 20,000 poises, more preferably 20 to 10,000 poises.

The melt viscosity is measured at a melting point (Tm)+10° C. at a shear rate of 1,000 (1/second) using a Koka type flow tester.

The melting point (Tm) in this case refers to the endothermic peak temperature (Tm2) observed by measuring the endothermic peak temperature (Tm1) observed when the produced polymer is heated at a rate of 20° C./min from room temperature in differential thermal analysis, holding at a temperature of Tm1+20° C. for 5 minutes, once cooling at a rate of 20° C./min to room temperature, and heating again at a rate of 20° C./min.

If a metal phosphate, metal phosphite or metal hypophosphite is added to the thermoplastic resin (B) consisting of said structural components (I) to (IV) of the present invention, the coloring of red phosphorus can be inhibited, and furthermore, the resistance stability can be enhanced. The metal phosphate, metal phosphite or metal hypophosphite can be selected from alkali metal salts, alkaline earth metal salts and transition metal salts of phosphoric acid, phosphorous acid and hypophosphorous acid, for example, lithium phosphate, potassium phosphate, sodium phosphate, calcium phosphate, magnesium phosphate, barium phosphate, aluminum phosphate, manganese phosphate, lithium phosphite, potassium phosphite, sodium phosphite, calcium phosphite, magnesium phosphate, barium phosphite, aluminum phosphite, manganese phosphite, lithium hypophosphite, potassium hypophosphite, sodium hypophosphite, calcium hypophosphite, manganese hypophosphite, barium hypophosphite, aluminum hypophosphite and manganese hypophosphite. Among them, sodium phosphate, potassium phosphate, calcium phosphate, sodium phosphite, potassium phosphite, calcium phosphite, sodium hypophosphite, potassium hypophosphite and calcium hypophosphite can be preferably used. Among them, sodium hypophosphite is especially preferable.

The amount of the metal phosphate, metal phosphite or metal hypophosphite used in the present invention is 0.001 to 10 parts by weight, preferably 0.01 to 3 parts by weight, more preferably 0.02 to 1 part by weight against 100 parts by weight of the thermoplastic resin (B) consisting of said structural components (I) to (IV).

If at least one compound selected from the metal phosphates, metal phosphites and metal hypophosphites is added when the thermoplastic resin (B) is polymerized, the color tone and heat resistance can be effectively improved.

For example, an aromatic hydroxycarboxylic acid such as p-hydroxybenzoic acid or 2-hydroxy-6-naphthoic acid, an aromatic dihydroxy compound such as 4,4'-dihydroxybiphenyl or hydroquinone, an aromatic dicarboxylic acid such as terephthalic acid, isophthalic acid or 2,6-naphthalenedicarboxylic acid and a polymer or oligomer of a polyester such as polyethylene terephthalate or bis (βhydroxyethyl) ester of an aromatic dicarboxylic acid such as bis (βhydroxyethyl) terephthalate can be subjected to polycondensation reaction to remove acetic acid, in the presence of acetic anhydride as a hydroxy group acylating agent after adding at least one compound selected from metal phosphates, metal phosphites and metal hypophosphites, for producing the thermoplastic resin (B).

The red phosphorus (C) used in the present invention is described below.

The red phosphorus (C) used in the present invention is unstable as it is, and is gradually dissolved in water, to gradually react with it. So, red phosphorus treated for preventing such phenomena can be preferably used. Red phosphorus for this purpose can be treated, for example, by transforming red phosphorus into fine grains without grinding it not to form crushed faces highly reactive with water and oxygen, on the surfaces of red phosphorus grains, or adding a slight amount of aluminum hydroxide or magnesium hydroxide to red phosphorus, to catalytically inhibit the oxidation of red phosphorus, or covering red phosphorus with paraffin or wax, to inhibit the contact with moisture, or mixing red phosphorus with ε-caprolactam or trioxane, to stabilize it, or covering red phosphorus with a phenol based, melamine based, epoxy based, unsaturated polyester based or other thermosetting resin, to stabilize it, or treating red phosphorus by an aqueous solution of a metal salt of copper, nickel, silver, iron, aluminum or titanium, etc., to precipitate a metal phosphorus compound on the surfaces of red phosphorus grains for stabilization, or covering red phosphorus with aluminum hydroxide, magnesium hydroxide, titanium hydroxide or zinc hydroxide, etc., or covering the surfaces of red phosphorus grains by electroless plating with iron, cobalt, nickel, manganese or tin, etc., or combining these methods. Preferably red phosphorus can be stabilized by transforming red phosphorus into fine grains without grinding red phosphorus not to form crushed faces on the surfaces of red phosphorus grains, or covering red phosphorus with a phenol based, melamine based, epoxy based, unsaturated polyester based or other thermosetting resin, or covering red phosphorus with aluminum hydroxide, magnesium hydroxide, titanium hydroxide or zinc hydroxide, etc. Especially preferably red phosphorus can be stabilized by transforming red phosphorus into fine grains without forming crushed faces on the surfaces of red phosphorus, or covering red phosphorus with a phenol based, melamine based, epoxy based, unsaturated polyester based or other thermosetting resin. Among these thermosetting resins, a phenol based thermosetting resin or epoxy based thermosetting resin can be used for covering red phosphorus preferably in view of moisture resistance, and especially preferably a phenol based thermosetting resin can be used for covering red phosphorus.

The average grain size of the red phosphorus used in the present invention is preferably 0.01 to 50 $\mu$m, more preferably 0.1 to 45 $\mu$m, further more preferably 0.1 to 30 $\mu$m in view of the flame retardancy and mechanical strength of the molding.

The electric conductivity of the red phosphorus (C) used in the present invention measured with extraction treatment in hot water (the electric conductivity can be measured by adding 100 ml of pure water to 5 g of red phosphorus, treating for extraction in an autoclave at 121° C. for 100 hours, filtering away red phosphorus, and diluting the filtrate to 250 ml) is usually 0.1 to 1000 $\mu$S/cm, preferably 0.1 to 800 $\mu$S/cm, more preferably 0.1 to 500 $\mu$S/cm in view of the flame retardancy, wet heat resistance, mechanical strength and electric properties (tracking resistance) of the molding obtained.

Preferable red phosphorus products marketed as grains with the electric conductivity kept in such a range include "Novaexell 140" and "Novaexell F5" produced by Rinkagaku Kogyo.

In the present invention, the amount of red phosphorus (C) added to 100 parts by weight of the component (A) consisting of 67 to 99.99 wt % (based on the total amount of (a1) and (a2)) of a thermoplastic resin (a1) other than polyethylene terephthalate and ethylene terephthalate copolymers and 33 to 0.01 wt % (based on the total amount of (a1) and (a2)) of polyethylene terephthalate and/or an ethylene terephthalate copolymer (a2) is preferably 0.01 to 30 parts by weight, more preferably 1 to 30 parts by weight, further more preferably 2 to 27 parts by weight, especially preferably 3 to 26 parts by weight, more especially preferably 5 to 25 parts by weight. More concretely, the amount of red phosphorus (C) added to the thermoplastic resin (a1) other than polyethylene terephthalate and ethylene terephthalate copolymers is preferably 0.1 to 30 parts by weight, more preferably 1 to 30 parts by weight, further more preferably 2 to 27 parts by weight, especially preferably 3 to 26 parts by weight, more especially preferably 5 to 25 parts by weight against 100 parts by weight of the thermoplastic resin (a1) other than polyethylene terephthalate and ethylene terephthalate copolymers.

If the thermoplastic resin (a1) other than polyethylene terephthalate and ethylene terephthalate copolymers is polybutylene terephthalate, the amount of red phosphorus (C) added is preferably 0.1 to 30 parts by weight, more preferably 1 to 25 parts by weight, further more preferably 2 to 20 parts by weight, especially preferably 3 to 20 parts by weight, more especially preferably 5 to 15 parts by weight against 100 parts by weight of polybutylene terephthalate. If the amount is less than 0.1 part by weight, flame retardancy is insufficient. If more than 30 parts, the mechanical properties become poor and the flame retardancy also becomes poor on the contrary.

If the thermoplastic resin (a1) other than polyethylene terephthalate and ethylene terephthalate copolymers is a polyamide resin, the amount of red phosphorus (C) added is preferably 0.1 to 30 parts by weight, more preferably 1 to 20 parts by weight, further more preferably 1 to 10 parts by weight, especially preferably 1 to 5 parts by weight against 100 parts by weight of the polyamide resin. If the amount is less than 0.1 part by weight, the flame retardancy is insufficient. If more than 30 parts by weight, the mechanical properties become poor and the flame retardancy also becomes poor on the contrary.

If the thermoplastic resin (a1) other than polyethylene terephthalate and ethylene terephthalate copolymers is a styrene based resin, the amount of red phosphorus (C) added is preferably 0.1 to 30 parts by weight, more preferably 1 to 25 parts by weight, further more preferably 2 to 20 parts by weight, especially preferably 3 to 20 parts by weight, more especially preferably 5 to 15 parts by weight against 100 parts by weight of the styrene based resin. If the amount is less than 0.1 part by weight, the flame retardancy is insufficient. If more than 30 parts by weight, the mechanical properties become poor, and the flame retardancy also becomes poor on the contrary.

In the present invention, the amount of red phosphorus (C) added to the thermosetting resin (B) consisting of said structural components (I) through (IV) is preferably 0.01 to 10 parts by weight, more preferably 0.05 to 5 parts by weight, further more preferably 0.06 to 1 part by weight, especially preferably 0.08 to 0.5 part by weight, more especially preferably 0.1 to 0.2 part by weight against 100 parts of the thermoplastic resin (B) consisting of said structural components (I) through (IV).

If a metal oxide is added as a stabilizer for red phosphorus to the flame retardant resin composition of the present invention, the stability during extrusion and molding, strength, heat resistance, etc. can be improved. The metal oxides which can be used here include cadmium oxide, zinc oxide, cuprous oxide, cupric oxide, ferrous oxide, ferric oxide, cobalt oxide, manganese oxide, molybdenum oxide, tin oxide, titanium oxide, etc. Among them, cadmium oxide, cuprous oxide, cupric oxide and titanium oxide are preferable. Among them, cuprous oxide, cupric oxide and titanium oxide are more preferable. Titanium oxide is especially preferable.

Titanium oxide is effective not only as a stabilizer for red phosphorus, but also for improving the coloration resistance of the resin composition obtained and the dispersibility of red phosphorus.

The amount of the metal oxide is preferably 0.01 to 20 parts by weight, more preferably 0.1 to 10 parts by weight, further more preferably 0.1 to 5 parts by weight against 100 parts by weight of the thermoplastic resin (a1) other than polyethylene terephthalate and ethylene terephthalate copolymers or the thermoplastic resin (B) consisting of said structural components (I) through (IV).

The flame retardant resin composition of the present invention can be greatly improved in strength, rigidity, heat resistance, etc. by further containing a fibrous and/or granular filler.

The fillers which can be used here include fibrous (including whiskers), powdery, granular or sheet-like organic or inorganic fillers such as glass fibers, carbon fibers, aromatic polyamide fibers, potassium titanate fibers, aluminum borate fibers, gypsum fibers, brass fibers, stainless steel fibers, steel fibers, ceramic fibers, boron fibers, asbestos fibers, alumina fibers, silica alumina fibers, graphite, mica, talc, silica, calcium carbonate, glass beads, glass flakes, glass microballoons, clay, wollastonite, titanium oxide and molybdenum disulfide. Among them, glass fibers, carbon fibers, potassium titanate fibers, aluminum borate fibers, mica and talc are preferable. Especially glass fibers are preferable. These fillers can also be treated by a silane based, titanate based or other coupling agent, or any other surface treating agent.

The amount of the filler added is preferably 5 to 140 parts by weight, more preferably 5 to 100 parts by weight against 100 parts by weight of the thermoplastic resin (a1) other than polyethylene terephthalate and ethylene terephthalate copolymers or the thermoplastic resin (B) consisting of said structural components (I) through (IV).

If a fluorine based resin is further added to the flame retardant resin composition of the present invention, the dripping of droplets during burning can be inhibited. The fluorine based resins which can be used here include polytetrafluoroethylene, polyhexafluoropropylene, (tetrafluoroethylene/hexafluoropropylene) copolymer, (tetrafluoroethylene/perfluoroalkyl vinyl ether) copolymers, (tetrafluoroethylene/ethylene) copolymer, (hexafluoropropylene/propylene) copolymer, polyvinylidene fluoride, (vinylidene fluoride/ethylene) copolymer, etc. Among them, polytetrafluoroethylene, (tetrafluoroethylene/perfluoroalkyl vinyl ether) copolymers, (tetrafluoroethylene/hexafluoropropylene) copolymer, (tetrafluoroethylene/ethylene) copolymer and polyvinylidene fluoride are preferable. Especially polytetrafluoroethylene and (tetrafluoroethylene/ethylene) copolymer are preferable.

The amount of the fluorine based resin is usually 0.01 to 5 parts by weight, preferably 0.1 to 2 parts by weight, more preferably 0.2 to 1 part by weight against 100 parts by weight of the thermoplastic resin (a1) other than polyethylene terephthalate and ethylene terephthalate copolymers or the thermoplastic resin (B) consisting of said structural components (I) through (IV) in view of mechanical properties and moldability.

If a hindered phenol based oxidation stabilizer is further added to the flame retardant resin composition of the present invention, very good mechanical properties can be maintained. The stabilizers which can be used here include, for example, triethylene glycol-bis[3-(3-t-butyl-5-methyl-4-hydroxyphenyl) propionate], 1,6-hexanediol-bis [3-(3,5-di-t-butyl-4-hydroxyphenyl) propionate], pentaerythrityl-tetrakis(3-(3,5-di-t-butyl-4-hydroxyphenyl) propionate], 2,2-thio-diethylenebis[3(3,5-di-t-butyl-4-hydroxyphenyl) propionate], octadecyl-3-(3,5-di-t-butyl-4-hydroxyphenyl) propionate, 3,5-di-t-butyl-4-hydroxybenzyl phosphate diethyl ester, 1,3,5-trimethyl-2,4,5-tris(3,5-di-t-butyl-4-hydroxybenzyl)benzene, bis or tris(3-t-butyl-6-methyl-4-hydroxyphenyl)propane, N,N'-hexamethylenebis(3,5-di-t-butyl-4-hydroxy-hydrocinnamide), N,N'-trimethylenebis(3, 5-di-t-butyl-4-hydroxy-hydrocynnamide), etc.

In the present invention, such a hindered phenol based oxidation stabilizer can be added as required, and in this case the amount of the hindered phenol based oxidation stabilizer added is usually 0.01 to 3 parts by weight, preferably 0.02 to 1 part by weight, more preferably 0.03 to 0.5 part by weight against 100 parts by weight of the thermoplastic resin (a1) other than polyethylene terephthalate and ethylene terephthalate copolymers or the thermoplastic resin (B) consisting of said structural components (I) through (IV).

If a salt formed by a triazine based compound and a cyanuric acid or isocyanuric acid is added further to the flame retardant resin composition of the present invention, the flame retardancy can be further enhanced. The salt of a triazine based compound and cyanuric acid or isocyanuric acid of the present invention is an addition product consisting of cyanuric acid or isocyanuric acid and a triazine based compound usually of 1:1 (molar ratio), or, as the case may be, 1:2 (molar ratio). The triazine based compounds which do not form a salt with cyanuric acid or isocyanuric acid are excluded.

The triazine based compounds which can be used here include those represented by the following general formula (1), etc.
[Chemical formula 17]

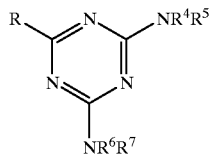

In the general formula (1), R4, R5, R6 and R7 stand for, respectively independently, a hydrogen atom, aryl group, alkyl group, aralkyl group, cycloalkyl group, or —$CONH_2$. The aryl group in this case preferably has 6 to 15 carbon atoms, and the alkyl group preferably has 1 to 10 carbon atoms. The aralkyl group preferably has 7 to 16 carbon atoms, and the cycloalkyl group preferably has 4 to 15 carbon atoms. Furthermore, R stands for the same group as —NR4R5 or —NR6NR7, or independently from them, a hydrogen atom, aryl group, alkyl group, aralkyl group, cycloalkyl group, —$NH_2$ or —$CONH_2$. In this case, the aryl group has preferably 6 to 15 carbon atoms, and the alkyl group has preferably 1 to 10 carbon atoms. The aralkyl group has preferably 7 to 16 carbon atoms, and the cycloalkyl group has preferably 4 to 15 carbon atoms.

R4, R5, R6 and R7 concretely stand for a hydrogen atom, phenyl group, p-toluyl group, α-naphthyl group, β-naphthyl group, methyl group, ethyl group, n-propyl group, isopropyl group, n-butyl group, sec-butyl group, tert-butyl group, hydroxymethyl group, methoxymethyl group, benzyl group, cyclopentyl group, cyclohexyl group, cycloheptyl group, 2-methyl-1-pentyl group, 4-methyl-1-cyclohexyl group, amido group, etc. Among them, a hydrogen atom, phenyl group, methyl group, hydroxymethyl group, methoxymethyl group, benzyl group and amido group are preferable.

R concretely stands for an amino group, amido group, methylamino group, dimethylamino group, ethylamino group, diethylamino group, mono(hydroxymethyl)amino group, di(hydroxymethyl)amino group, mono(methoxymethyl)amino group, di(methoxymethyl)amino group, phenylamino group, diphenylamino group, hydrogen atom, phenyl group, p-toluyl group, α-naphthyl group, β-naphthyl group, methyl group, ethyl group, n-propyl group, isopropyl group, n-butyl group, sec-butyl group, tertbutyl group, benzyl group, cyclopentyl group, cyclohexyl group, cycloheptyl group, 2-methyl-1-pentyl group, 4-methyl-1-cyclohexyl group, etc. Among them, a hydrogen atom, amino group, amido group, methyl group, mono(hydroxymethyl)amino group, di(hydroxymethyl)amino group, mono(methoxymethyl) amino group, di(methoxymethyl) amino group, phenyl group and benzyl group are preferable.

The salts formed by any of the compounds represented by said general formula (1) and cyanuric acid or isocyanuric acid which can be preferably used in the present invention are salts of melamine, benzoguanamine, acetoguanamine, 2-amido-4,6-diamino-1,3,5-triazine, mono(hydroxymethyl) melamine, di(hydroxymethyl)melamine and tri (hydroxymethyl)melamine. Among them, salts of melamine, benzoguanamine and acetoguanamine are preferable.

The salt formed by a triazine based compound and cyanuric acid or isocyanuric acid is a powder obtained by making a water slurry of a mixture consisting of the triazine based compound and cyanuric acid or isocyanuric acid, mixing it sufficiently to form the salt of both the compounds as fme grains, filtering the slurry, and drying the residue. It is not a simple mixture. The salt is not required to be perfectly pure, and may contain a small amount of an unreactive triazine based compound or cyanuric acid or isocyanuric acid.

The average grain size of the salt is preferably 0.01 to 100 μm, more preferably 0.1 to 80 μm, further more preferably 1 to 50 μm, in view of the flame retardancy, mechanical strength and surface properties of the molding. If the salt is poor in dispersibility, a dispersing agent such as tris (βhydroxyethyl) isocyanurate can also be used together.

The amount of the salt used is usually 0.01 to 40 parts by weight, preferably 0.1 to 30 parts by weight, further more preferably 0.5 to 20 parts by weight against 100 parts by weight of the thermoplastic resin (a1) other than polyethylene terephthalate and ethylene terephthalate copolymers or the thermoplastic resin (B) consisting of said structural components (I) through (IV).

Furthermore, one or more ordinary additives such as a phosphorus based, sulfur based or other antioxidant other than hindered phenol based antioxidants, thermal stabilizer, ultraviolet absorbent, lubricant, releasing agent and colorant including a dye or pigment can also be added to the flame retardant resin composition of the present invention, as far as the object of the present invention is not impaired.

The flame retardant resin composition of the present invention can be produced by any ordinary publicly known method. For example, it can be produced by feeding a thermoplastic resin (a1) other than polyethylene terephthalate and ethylene phthalate copolymers or a thermoplastic resin (B) consisting of the structural components (I) through (IV), and polyethylene terephthalate and/or an ethylene terephthalate (a2), red phosphorus (C) and other necessary additives, to an extruder, etc. after or without preliminarily mixing them, to sufficiently melt-knead. Preferably in view of handling convenience and productivity, it can be produced by once melt-kneading part of the thermoplastic resin (a1) other than polyethylene terephthalate and ethylene terephthalate copolymers or the thermoplastic resin (B) consisting of said structural components (I) through (IV), or part of the polyethylene terephthalate and/or ethylene terephthalate copolymer (a2), with red phosphorus (C), to produce a resin composition (D) higher in red phosphorus content than the red phosphorus content to be achieved in the intended flame retardant resin composition, and melt-kneading the resin composition (D) higher in red phosphorus and other additives used as desired, to the remaining amount of the thermoplastic resin (a1) other than polyethylene terephthalate and ethylene terephthalate copolymers or the thermoplastic resin (B) consisting of said structural components (I) through (IV) or the polyethylene terephthalate and/or ethylene terephthalate copolymer (a2).

As a further other method, it can be produced by once melt-kneading part of the thermoplastic resin (a1) other than polyethylene terephthalate and ethylene terephthalate copolymers or the thermoplastic resin (B) consisting of said structural components (I) through (IV), or part of the polyethylene terephthalate and/or ethylene terephthalate copolymer (a2), with red phosphorus (C) and other additives used as desired, to produce a resin composition (D) higher in red phosphorus content than the red phosphorus content to be achieved in the intended flame retardant resin composition, and melt-kneading the resin composition (D) higher in red phosphorus and additives other than the additives used for producing the resin composition (D) higher in red phosphorus content, to the remaining amount of the thermoplastic resin (a1) other than polyethylene terephthalate and ethylene terephthalate copolymers or the thermoplastic resin (B) consisting of said structural components (I) through (IV) or the polyethylene terephthalate and/or ethylene terephthalate copolymer (a2).

When the additives used as desired are added when the resin composition (D) higher in red phosphorus content than the red phosphorus content to be achieved in the intended flame retardant resin composition is produced, it is preferable to mix the additives used as desired, with red phosphorus beforehand.

Especially when a metal oxide, particularly titanium oxide used as a stabilizer of red phosphorus is added among the additives used as desired, the titanium oxide is preferably added when the resin composition (D) higher in red phosphorus is produced. Furthermore, if red phosphorus and titanium oxide are mixed by a mechanical mixer such as Henschel mixer, the stability and dispersibility of red phosphorus and the coloration resistance of the resin composition obtained can be improved.

The resin composition (D) higher in red phosphorus can be preferably used as so-called master pellets, but the form is not limited to it, and can also be chips, powder or their mixture. The thermoplastic resin (a1) other than polyethylene terephthalate and ethylene terephthalate copolymers or the thermoplastic resin (B) consisting of said structural components (I) through (IV) to be mixed with the resin composition (D) higher in red phosphorus content can be preferably pellets, but the form is not limited to it, and can also be chips, powder or their mixture. It is preferable that the resin composition higher in red phosphorus content, and the thermoplastic resin (a1) other than polyethylene terephthalate and ethylene terephthalate copolymers, or the thermoplastic resin (B) consisting of the structural components (I) through (IV) to be mixed with it are preferably almost the same or similar in form and size in view of the possibility to mix homogeneously. When the flame retardant resin composition is produced, a single-screw, double-screw or triple-screw extruder with "Unimelt" type screw(s) or a kneader, etc. can also be used. Furthermore as described above, the present invention is intended to make the thermoplastic resin (a1) other than polyethylene terephthalate and ethylene terephthalate copolymers flame retardant by using the polyethylene terephthalate and/or ethylene terephthalate copolymer (a2) and red phosphorus (C).

Therefore, the resin composition of the present invention consisting of the polyethylene terephthalate and/or ethylene terephthalate copolymer (a2) and red phosphorus (C) can be used as a flame retardant agent of the thermoplastic resin (a1) other than polyethylene terephthalate and ethylene terephthalate copolymers. The resin composition consisting of the polyethylene terephthalate and/or ethylene terephthalate copolymer (a2) and red phosphorus (C) as a flame retardant agent consists of 100 parts by weight of the polyethylene terephthalate and/or ethylene terephthalate copolymer (a2) and 0.01 to 250 parts by weight, preferably 10 to 200 parts by weight, further more preferably 20 to 100 parts by weight of red phosphorus (C).

Therefore, the flame retardant resin composition can be molded by any ordinary publicly known method into a sheet or film, etc. by injection molding, extrusion molding or compression molding, etc. Above all, the flame retardant resin composition is especially suitable for injection molding, and its features can be used for mechanical parts, electric and electronic parts, automobile parts, and housings and parts of office automation apparatuses, household electric appliances, etc.

EXAMPLES

The effects of the present invention are further described below in reference to examples. The "parts" in the following examples means "parts by weight". The respective properties were measured according to the following methods.

(1) Flame retardancy

Specimens for evaluation of flame retardancy obtained by injection molding were evaluated in flame retardancy according to the criterion specified in UL94. The flame retardancy levels are in the order of V-0>V-1>V-2>HB.

(2) Mechanical property

Dumbbell specimens obtained by injection molding were measured to find their tensile yield strengths according to ASTM D 638.

(3) Wet heat resistance (bleed-out)

Specimens obtained by injection molding were treated at 121° C. at 100% RH for 100 hours, and the surfaces of the specimens were observed by an optical microscope. Bleed-out levels were in the order of ⊙ (no precipitate was observed), o (little precipitate was observed), Δ (some precipitate was observed), and x (much precipitate was observed).

(4) Wet heat resistance (tensile strength holding rate)

Dumbbell specimens obtained by injection molding were treated at 121° C. at 100% RH for 100 hours, and measured to find their tensile yield strengths according to ASTM D 638. Tensile strength holding rates were calculated from the following formula:

Tensile strength holding rate (%)=(Tensile strength after treatment/Tensile strength before treatment)×100

Making PBT Resins Flame Retardant

Examples 1 Through 8, and Comparative Examples 1 Through 10

Polyethylene terephthalate (PET) of 0.65 in intrinsic viscosity (1:1 mixed solvent of phenol/tetrachloroethane at 25° C.) and red phosphorus ("Novaexell" 140 produced by Rinkagaku Kogyo, 29.7 μm in average grain size, 200 μmS/cm in the electric conductivity obtained by adding 100 ml of pure water to 5 g of red phosphorus, treating the mixture in an autoclave at 121° C. for 100 hours for extraction, filtering away red phosphorus, diluting the filtrate to 250 ml, and measuring using an electric conductivity meter (Personal SC Meter produced by Yokogawa Electric Corp.) and other additives were mixed at a ratio shown in Table 1, 2 or 3 with 100 parts by weight of Toray PBT1100S (PBT resin produced by Toray Industries, Inc.), and under nitrogen flow, the mixture was melt-extruded in a resin temperature range of 260 to 280° C. using a coaxially rotating double-screw extruder of 30 mm in screw diameter and 45.5 in L/D (TEX-30 produced by The Japan Steel Works, Ltd., using two screws engaged with each by 3.5 mm; screw elements consisting of 10 kneading discs of L/D=4 inclined at 45° are provided in alternately forward and backward directions, with a reverse full-flighted element provided additionally to give a screw form with powerful kneading force). The pellets obtained were dried and inspection-molded (80° C. in mold temperature), to prepare specimens for evaluation.

The evaluation results of respective samples in flame retardancy, wet heat resistance (bleed-out and strength holding rate) and mechanical property (tensile strength) are shown in Tables 1 to 3.

The resins and additives used were as stated below.

When glass fibers were used for reinforcement, they were added to achieve a glass fiber content of 30 wt % with the entire resin composition as 100 wt %.

PBT: Toray PBT1100S (produced by Toray Industries, Inc.
Nylon: Polyamide 6 ("CM1010" produced by Toray Industries, Inc.)
GF: Glass fibers ("CS3PE941S" produced by Nitto Boseki Co., Ltd.)
Fluorine based resin: Polytetrafluoroethylene ("Teflon 6J" produced by Mitsui-Du Pont Fluorochemicals)
Cyanurate: Melamine cyanurate ("MC440" produced by Nissan Chemical Industries, Ltd.)
Stabilizer: Pentaerythrityl-tetrakis(3-(3,5-di-t-butyl-4-hydroxyphenyl) propionate]
("IR-1010" produced by Chiba-Geigi)
Metal oxide: Cuprous oxide (produced by Katayama Chemical Industries, Ltd.)

TABLE 1

| Table 1 | Resin composition (parts by weight) | | | | Properties | | | | Wet heat resistance | Mechanical Property |
|---|---|---|---|---|---|---|---|---|---|---|
| | | | | | Flame retardancy | | | | Tensile strength | Tensile strength (MPa) |
| | | | | | UL-94 1/16" | | UL-94 1/32" | | | |
| | PBT | PET | Red phosphorus | Polyamide (PA6) | Flame retardancy | Burning time (seconds) | Flame retardancy | Burning time (seconds) | Bleed-out | Holding rate (%) |
| Example 1 | 100 | 10 | 10 | — | V-0 | 45 | V-1 | 62 | ⊚ | 90 | 55 |
| Example 2 | 100 | 20 | 10 | — | V-0 | 38 | V-1 | 60 | ⊚ | 90 | 57 |
| Example 3 | 100 | 30 | 10 | — | V-0 | 38 | V-1 | 60 | ⊚ | 89 | 58 |
| Comparative example 1 | 100 | 0 | 10 | — | V-2 | 67 | HB | >150 | X | 90 | 54 |
| Comparative example 2 | 100 | 70 | 15 | — | V-1 | 56 | HB | >150 | Δ | 60 | 52 |
| Comparative example 3 | 0 | 100 | 10 | — | V-0 | 40 | V-2 | 65 | ○ | 40 | 60 |
| Comparative example 4 | 100 | 0 | 10 | 20 | V-2 | 60 | HB | >150 | X | 85 | 50 |

TABLE 2

| Table 2 | Resin composition (parts by weight) | | | | | | Properties | | | | Wet heat resistance | Mechanical property |
|---|---|---|---|---|---|---|---|---|---|---|---|---|
| | | | | | | | Flame retardancy | | | | Tensile strength | Tensile strength (Mpa) |
| | | | | | | | UL-94 1/16" | | UL-94 1/32" | | | |
| | | | | | | | Burning | | Burning | | Holding | |
| | PBT | PET | Red phosphorus | Polyamide (nylon 6) | Glass fibers | Stabilizer | Flame retardancy | time (seconds) | Flame retardancy | time seconds | Bleed-out | rate (%) |
| Example 4 | 100 | 10 | 10 | — | 45 | 0.2 | V-0 | 48 | V-1 | 62 | ⊚ | 60 | 140 |
| Example 5 | 100 | 20 | 10 | — | 55 | 0.2 | V-0 | 35 | V-1 | 61 | ⊚ | 56 | 145 |
| Example 6 | 100 | 30 | 10 | — | 65 | 0.2 | V-0 | 35 | V-1 | 62 | ⊚ | 55 | 147 |
| Comparative example 5 | 100 | 0 | 10 | — | 45 | 0.2 | HB | >150 | HB | >150 | X | 57 | 137 |
| Comparative example 6 | 100 | 70 | 15 | — | 80 | 0.2 | V-1 | 60 | HB | >150 | Δ | 38 | 140 |
| Comparative example 7 | 0 | 100 | 10 | — | 45 | 0.2 | V-0 | 35 | V-2 | 68 | Δ | 24 | 150 |
| Comparative example 8 | 100 | 0 | 10 | 20 | 55 | 0.2 | V-2 | 61 | HB | >150 | X | 55 | 135 |

TABLE 3

| Table 3 | Resin composition (parts by weight) | | | | | | | | Properties | | | | | |
| --- | --- | --- | --- | --- | --- | --- | --- | --- | --- | --- | --- | --- | --- | --- |
| | | | | | | | | | Flame retardancy | | | | Wet heat resistance | Mechanical |
| | | | | | | | | | UL-94 1/16" | | UL-94 1/32" | | Tensile | Property |
| | PBT | PET | Red phosphorous | Glass fibers | Fluorine based resin | Cyanurate | Metal oxide | Stabilizer | Flame retardancy | Burning time (seconds) | Flame retardancy | Burning time (seconds) | Bleed-out | strength Holding rate (%) | Tensile strength (MPa) |
| Example 7 | 100 | 20 | 10 | 0 | 0.5 | 5 | 0.5 | 0.2 | V-0 | 30 | V-0 | 48 | ⊙ | 92 | 60 |
| Comparative example 9 | 100 | 70 | 15 | 0 | 0.5 | 5 | 0.5 | 0.2 | V-0 | 48 | V-2 | 68 | Δ | 60 | 50 |
| Example 8 | 100 | 20 | 10 | 55 | 0.5 | 5 | 0.5 | 0.2 | V-0 | 20 | V-0 | 40 | ⊙ | 60 | 150 |
| Comparative example 10 | 100 | 70 | 15 | 80 | 0.5 | 5 | 0.5 | 0.2 | V-0 | 48 | V-2 | 60 | Δ | 40 | 140 |

From the evaluation results of Examples 1 through 3 and Comparative Examples 1 through 4, it can be seen that if PET and red phosphorus are added to PBT respectively by amounts specified in-the present invention, the resin composition obtained has specifically excellent flame retardancy and can be specifically prevented from bleeding and from declining in strength holding rate when treated at high temperature and high humidity. Furthermore, from Comparative Example 1, it can be seen that if red phosphorus only is used, the flame retardancy is poor, but that if PET and red phosphorus are used together by amounts specified in the present invention, even a thin molding can have excellent flame retardancy. Thus, it can be seen that PET and red phosphorus manifest the effect of a flame retardant agent.

On the other hand, from Example 2 and Comparative Example 4, it can be seen that even if nylon 6 is used instead of PET, excellent flame retardancy and wet heat resistance cannot be manifested.

From the evaluation results of Examples 4 through 6 and Comparative Examples 5 through 8, it can be seen that also when glass fibers are used for reinforcement, adding specific amounts of PET and red phosphorus to PBT resin allows specifically excellent flame retardancy and wet heat resistance to be manifested.

From Example 7 and Comparative Example 9, it can be seen that if specific amounts of PET and red phosphorus, and furthermore a fluorine based resin and a cyanurate are used together, the molding is more excellent in flame retardancy even when it is thin. From Example 8 and Comparative Example 10, it can be seen that also when glass fibers are used for reinforcement, excellent flame retardancy and wet heat resistance can be manifested.

From the above, it can be seen that if specific amounts of PET and red phosphorus are added to PBT resin, PET and red phosphorus manifest their effect as a flame retardant agent, to provide excellent flame retardancy, and can furthermore inhibit the bleeding in high temperature high humidity treatment and the decline of strength holding rate.

Example 9

Fifty parts by weight of red phosphorus ("Novaexell" 140 produced by Rinkagaku Kogyo) were mixed with 100 parts by weight of Toray PBT1100S (PBT resin produced by Toray Industries, Inc.), and under nitrogen flow, the mixture was melt-extruded in a resin temperature range of 260 to 280° C. using a coaxially rotating double-screw extruder of 30 mm in screw diameter and 45.5 L/D (TEX-30 produced by The Japan Steel Works, Ltd.), to produce a PBT composition high in red phosphorus content. The PBT composition high in red phosphorus was used for extruding and molding a resin composition as described in the above examples. The results are shown in Table 4.

Example 10

Fifty parts by weight of red phosphorus ("Novaexell" 140 produced by Rinkagaku Kogyo) were mixed with 100 parts by weight of polyethylene terephthalate (PET) of 0.65 in intrinsic viscosity (1:1 mixed solvent of phenol/tetrachloroethane at 25° C.), and under nitrogen flow, the mixture was melt-extruded in a resin temperature range of 260 to 280° C. using a coaxially rotating double-screw extruder of 30 mm in screw diameter and 45.5 in L/D (TEX-30 produced by The Japan Steel Works, Ltd.), to produce a PET composition high in red phosphorus content. The PET composition high in red phosphorus content was used for extruding and molding a resin composition as described in the above examples. The results are shown in Table 4.

In comparison of Example 8 with Examples 9 and 10, it can be seen that if a composition high in red phosphorus content is used, the burning time can be shortened while the tensile strength can be improved.

TABLE 4

| Table 4 | Resin composition (parts by weight) | | | | | | | | Properties | | | | | | |
|---|---|---|---|---|---|---|---|---|---|---|---|---|---|---|---|
| | Composition | | | | | | | | Flame retardancy | | | | Wet heat resistance | Mechanical Property |
| | | | | | | | | | UL-94 1/16" | | UL-94 1/32" | | | Tensile | Tensile |
| | PBT | PET | high in red phosphorus content (50%) | Glass fibers | Fluoride based resin | Cyanurate | Metal oxide | Stabilizer | Flame retardancy | Burning time (seconds) | Flame retardancy | Burning time (seconds) | Bleed-out | strength Holding rate (%) | strength (MPa) |
| Example 9 | 90 | 20 | 20(Red phosphorus:10) (PBT:10) | 55 | 0.5 | 5 | 0.5 | 0.2 | V-0 | 11 | V-0 | 25 | ◎ | 70 | 155 |
| Example 10 | 100 | 10 | 20 (Red phosphorus:10) (PBT:10) | 55 | 0.5 | 5 | 0.5 | 0.2 | V-0 | 10 | V-0 | 23 | ◎ | 71 | 157 |

Making Nylon Resins Flame Retardant

Examples 11 Through 22 and Comparative Examples 11 Through 16

Resin compositions were produced as described above. The resins and other additives used were as stated below.

Polyamide 6 (PA6): Amilan CM1010 (produced by Toray Industries, Inc.)

Polyamide 66 (PA66): Amilan CM3001 (produced by Toray Industries, Inc.)

Polyethylene terephthalate (PET): Polyethylene terephthalate of 0.65 in intrinsic viscosity (1:1 mixed solvent of phenol/tetrachloroethane at 25° C.)

Ethylene terephthalate copolymer: Ethylene terephthalate copolymer "Easter"

GN002 (produced by Eastman Kodak) with terephthalic acid used as a dicarboxylic acid component, and ethylene glycol and cyclohexanedimethanol used at a molar ratio of 70/30

The results of respective samples in flame retardancy, wet heat resistance (bleed-out) and mechanical property (tensile strength) are shown in Tables 5 and 6. Since the samples were not so different in the decline of strength, the bleed-out property was used as a wet heat resistance indicator.

TABLE 5

| Table 5 | Resin composition (parts by weight) | | | | | Properties | | | | | |
|---|---|---|---|---|---|---|---|---|---|---|---|
| | Polyamide | | PET | PET copolymer | Red phosphorus | Flame retardancy | | | | Wet heat resistance Bleed-out | Mechanical Property Tensile strength (MPa) |
| | | | | | | UL-94 1/16" | | UL-94 1/32" | | | |
| | PA6 | PA66 | | | | Flame retardancy | Burning time (seconds) | Flame retardancy | Burning time (seconds) | | |
| Example 11 | 100 | | 10 | | 5 | V-0 | 28 | V-0 | 32 | ◎ | 77 |
| Example 12 | 100 | | | 20 | 5 | V-0 | 22 | V-0 | 33 | ◎ | 79 |
| Example 13 | | 100 | 30 | | 5 | V-0 | 27 | V-0 | 33 | ◎ | 78 |
| Example 14 | | 100 | | 40 | 5 | V-0 | 20 | V-0 | 33 | ◎ | 80 |
| Example 15 | | 100 | | 20 | 12 | V-0 | 23 | V-1 | 59 | ◎ | 78 |
| Example 16 | | 100 | | 20 | 12 | V-0 | 22 | V-1 | 60 | ◎ | 77 |
| Example 17 | 100 | | | 20 | 10 | V-0 | 21 | V-1 | 57 | ◎ | 74 |
| Example 18 | | 100 | 20 | | 10 | V-0 | 22 | V-1 | 56 | ◎ | 75 |
| Example 19 | 100 | | 10 | | 3 | V-0 | 24 | V#1 | 59 | ◎ | 78 |
| Example 20 | | 100 | 10 | | 3 | V-0 | 23 | V-1 | 58 | ◎ | 78 |
| Example 21 | 100 | | 10 | | 20 | V-0 | 24 | V-1 | 61 | ◎ | 74 |
| Example 22 | | 100 | 10 | | 20 | V-0 | 25 | V-1 | 62 | ◎ | 75 |

TABLE 5

| Table 5 | Resin composition (parts by weight) | | | | | Properties | | | | | |
|---|---|---|---|---|---|---|---|---|---|---|---|
| | Polyamide | | PET | PET copolymer | Red phosphorus | Flame retardancy | | | | Wet heat resistance | Mechanical Property |
| | | | | | | UL-94 1/16" | | UL-94 1/32" | | | |
| | PA6 | PA66 | | | | Flame retardancy | Burning time (seconds) | Flame retardancy | Burning time (seconds) | Bleed-out | Tensile strength (MPa) |
| Comparative example 11 | 100 | | | | 10 | V-0 | 44 | V-2 | 65 | X | 64 |
| Comparative example 12 | | 100 | | | 20 | V-0 | 43 | V-2 | 63 | X | 65 |
| Comparative example 13 | 100 | | 60 | | 20 | V-0 | 46 | V-2 | 67 | X | 46 |
| Comparative example 14 | | 100 | 60 | | 10 | V-0 | 45 | V-2 | 68 | X | 43 |
| Comparative example 15 | 100 | | 10 | | 40 | V-2 | 64 | HB | >150 | X | 32 |
| Comparative example 16 | | 100 | 20 | | 40 | V-2 | 63 | HB | >150 | X | 35 |

TABLE 6

| Table 6 | Resin composition (parts by weight) | | | | | | | | | |
|---|---|---|---|---|---|---|---|---|---|---|
| | Polyamide | | PET | PET copolymer | Red phosphorus | Glass fibers | Fluorine based resin | Cyanurate | Metal oxide | Stabilizer |
| | PA6 | PA66 | | | | | | | | |
| Example 23 | 100 | | 10 | | 5 | | 0.5 | 5 | 0.5 | 0.2 |
| Example 24 | 100 | | | 20 | 5 | | 0.5 | 5 | 0.5 | 0.2 |
| Example 25 | | 100 | 30 | | 5 | | 0.5 | 5 | 0.5 | 0.2 |
| Example 26 | | 100 | | 40 | 5 | | 0.5 | 5 | 0.5 | 0.2 |
| Example 27 | 100 | | 20 | | 8 | 55 | | | | |
| Example 28 | 100 | | | 20 | 8 | 55 | | | | |
| Example 29 | | 100 | 20 | | 8 | 55 | | | | |
| Example 30 | | 100 | | 20 | 8 | 55 | | | | |
| Comparative example 17 | 100 | | | | 8 | 45 | | | | |
| Comparative example 18 | | 100 | | | 10 | 50 | | | | |
| Comparative example 19 | 100 | | | 60 | 20 | 80 | | | | |

| | Properties | | | | | |
|---|---|---|---|---|---|---|
| | Flame retardancy | | | | Wet heat resistance Bleed-out | Mechanical Property |
| | UL-94 1/16" | | UL-94 1/32" | | | |
| | Flame retardancy | Burning time (seconds) | Flame retardancy | Burning time (seconds) | | Tensile strength (MPa) |
| Example 23 | V-0 | 17 | V-0 | 21 | ⊙ | 78 |
| Example 24 | V-0 | 13 | V-0 | 18 | ⊙ | 83 |
| Example 25 | V-0 | 18 | V-0 | 22 | ⊙ | 82 |
| Example 26 | V-0 | 14 | V-0 | 17 | ⊙ | 86 |
| Example 27 | V-0 | 25 | V-0 | 29 | ⊙ | 168 |
| Example 28 | V-0 | 24 | V-0 | 26 | ⊙ | 172 |
| Example 29 | V-0 | 26 | V-0 | 28 | X | 174 |
| Example 30 | V-0 | 22 | V-0 | 24 | X | 176 |
| Comparative example 17 | V-0 | 35 | V-2 | 66 | X | 150 |
| Comparative example 18 | V-0 | 32 | V-2 | 65 | X | 152 |
| Comparative example 19 | V-0 | 33 | V-2 | 65 | X | 140 |

TABLE 6

| Table 6 | Resin composition (parts by weight) | | | | | | | | | |
|---|---|---|---|---|---|---|---|---|---|---|
| | Polyamide | | PET | | Red phosphorus | Glass fibers | Fluorine based resin | Cyanurate | Metal oxide | Stabilizer |
| | PA6 | PA66 | PET | PET copolymer | | | | | | |
| Comparative example 20 | | 100 | 60 | | 10 | 70 | | | | |
| Comparative example 21 | 100 | | 10 | | 40 | 65 | | | | |
| Comparative example 22 | | 100 | 10 | | 40 | 65 | | | | |
| Example 31 | 100 | | 20 | | 8 | 55 | 0.5 | 5 | 0.5 | 0.2 |
| Example 32 | 100 | | | 20 | 8 | 55 | 0.5 | 5 | 0.5 | 0.2 |
| Example 33 | | 100 | 20 | | 8 | 55 | 0.5 | 5 | 0.5 | 0.2 |
| Example 34 | | 100 | | 20 | 8 | 55 | 0.5 | 5 | 0.5 | 0.2 |

| | Properties | | | | | |
|---|---|---|---|---|---|---|
| | Flame retardancy | | | | | Mechanical Property |
| | UL-94 1/16" | | UL-94 1/32" | | | |
| | Flame retardancy | Burning time (seconds) | Flame retardancy | Burning time (seconds) | Wet heat resistance Bleed-out | Tensile strength (MPa) |
| Comparative example 20 | V-0 | 31 | V-2 | 64 | X | 141 |
| Comparative example 21 | V-2 | 68 | HB | >150 | X | 133 |
| Comparative example 22 | V-2 | 67 | HB | >150 | X | 132 |
| Example 31 | V-0 | 15 | V-0 | 19 | ⊚ | 169 |
| Example 32 | V-0 | 11 | V-0 | 16 | ⊚ | 174 |
| Example 33 | V-0 | 16 | V-0 | 20 | ⊚ | 172 |
| Example 34 | V-0 | 12 | V-0 | 15 | ⊚ | 175 |

From the evaluation results of Examples 11 through 22 and Comparative Examples 11 through 16, it can be seen that if PET or its copolymer and red phosphorus are added to a polyamide resin by amounts specified in the present invention, a resin composition which is specifically excellent in flame retardancy and which does not bleed out the flame retardant agent in dry heat treatment can be obtained. As can be seen from Comparative Examples 11 and 12, if red phosphorus only is added to PA6 or PA66, a product of 1/16" is V-0 in flame retardancy, but a product as thin as 1/32", is not sufficient in flame retardancy. Furthermore, in wet heat treatment, the product bleeds out. From Comparative Examples 13 through 16, it can be seen that if the amount of PET or red phosphorus is too large, the flame retardancy rather declines, and the tensile strength also declines. On the other hand, as shown in the examples of the present invention, if PET and red phosphorus are used by amounts specified in the present invention, a flame retardancy level of V-1 or V-0 can be achieved even if the product is as thin as 1/32", and that the bleed-out property can also be improved.

From the evaluation results of Examples 23 through 26, if specific amounts of PET or its copolymer and red phosphorus, and furthermore a fluorine based resin and a cyanurate, etc. are used together, the burning time can be further shortened, and more excellent flame retardancy can be obtained.

From the evaluation results of Examples 27 through 30 and Comparative Examples 17 through 22, it can be seen that even if glass fibers are used for reinforcement, specific amounts of PET or its copolymer and red phosphorus added to a polyamide resin can provide a resin composition specifically excellent in flame retardancy without causing the flame retardant agent to be bled out, like a resin composition not reinforced by glass fibers.

From Examples 31 through 34, it can be seen that additional use of a fluorine based resin and a cyanurate, etc. allows the burning time to be shortened further and allows highly excellent flame retardancy to be obtained.

Examples 35 and 36

Fifty parts by weight of red phosphorus ("Novaexell" 140 produced by Rinkagaku Kogyo) were added to 100 parts by weight of Amilan CM1010 (produced by Toray Industries, Inc.) or Amilan CM3001 (produced by Toray Industries, Inc.), and under nitrogen flow, the mixture was melt-extruded in a resin temperature range of 260 to 280° C. using a coaxially rotating double-screw extruder of 30 mm in screw diameter and 45.5 in L/D (TEX-30 produced by The Japan Steel Works, Ltd.), to produce a PA6 or PA66 composition high in red phosphorus content. The composition high in red phosphorus content was used for extruding and molding a resin composition as described in the above examples. The results are shown in Table 7.

It can be seen that the use of a resin composition high in red phosphorus content allows the burning time to be further shortened and the tensile strength to be further enhanced.

TABLE 7

| Table 7 | Resin composition (parts by weight) | | | | | | | | | |
|---|---|---|---|---|---|---|---|---|---|---|
| | Polymide | | PET | PET copolymer | Composition on high in red phosphorus content (50%) | Glass fibers | Fluorine based resin | Cyanurate | Metal Oxide | Stabilizer |
| | PA6 | PA66 | PET | | | | | | | |
| Example 35 | 92 | | 20 | | 16 (Red phosphorus:8) (PA6:8) | 55 | 0.5 | 5 | 0.5 | 0.2 |
| Example 36 | | 92 | 20 | | (Red phosphorus:8) (PA 66:8) | 55 | 0.5 | 5 | 0.5 | 0.2 |

| | Properties | | | | | |
|---|---|---|---|---|---|---|
| | Flame retardancy | | | | | Mechanical |
| | UL-94 1/16" | | UL-94 1/32" | | | Property |
| | Flame retardancy | Burning time (seconds) | Flame retardancy | Burning time (seconds) | Wet heat resistance Bleed-out | Tensile strength (MPa) |
| Example 35 | V-0 | 10 | V-0 | 13 | ⊙ | 178 |
| Example 36 | V-0 | 12 | V-0 | 15 | ⊙ | 182 |

Making an ABS Resin Flame Retardant

Examples 37 Through 39, and Comparative Examples 23 Through 26

The resins and other additives used in these examples were as stated below.
ABS resin: "Toyolac" (type 100) (produced by Toray Industries, Inc.)
PC (polycarbonate): "lupilon" S2000 (produced by Mitsubishi Gas Chemical Co., Inc.)
Polyamide 6 (PA6): Amilan CM1010 (produced by Toray Industries, Inc.) Aromatic phosphate: "PX-200" (produced by Daihachi Chemical) The ABS resin, polyester resin and/or polyamide resin, red phosphorus and other compounds were mixed at a ratio shown in Table 8, and the mixture was melt-kneaded and extruded at a resin temperature of 230° C., to produce a polymer as pellets. It was molded into specimens by an injection molding machine at a cylinder temperature of 230° C. at a mold temperature of 60° C. The ABS resin compositions obtained were evaluated in flame retardancy, mechanical property (impact strength), wet heat resistance (bleed-out), heat resistance (load deflection temperature) and flowability (MFR) according to the following methods. Since they were no so different in the decline of strength, the bleed-out property was used as a wet heat resistance indicator. The mechanical property was evaluated in reference to impact strength.

(1) ½" Izod impact strength: According to ASTM D 256-56A.
(2) MFR: According to JIS K 7210 (220° C., 10000 g in load). A larger value means better flowability at the time of molding.
(3) Load deflection temperature: According to ASTM D 648 (1.82 MPa in load).
(4) Flame retardancy: A vertical burning test was conducted using burning specimens of 1/16"×½"×5" according to UL94.

The results of respective samples in flame retardancy, wet heat resistance (bleed out) and mechanical property are shown in Table 8.

TABLE 8

| Table 8 | Resin composition (parts by weight) | | | | | Properties Flame retardancy | | | |
|---|---|---|---|---|---|---|---|---|---|
| | | | PET | | | UL-94 1/16" | | UL-94 1/32" | |
| | ABS | PET | PET copolymer | Red phosphorus | Other additive | Flame retardancy | Burning time (seconds) | Flame retardancy | Burning time (seconds) |
| Example 37 | 100 | 20 | | 10 | | V-0 | 34 | V-2 | 65 |
| Example 38 | 100 | | 20 | 10 | | V-0 | 38 | V-2 | 65 |
| Example 39 | 100 | | 20 | 10 | Fluorine based resin:0.25 | V-0 | 18 | V-0 | 30 |

TABLE 8-continued

| | | | | | | | | |
|---|---|---|---|---|---|---|---|---|
| Comparative example 23 | 100 | 20 | — | PC:20 Aromatic phosphate:20 | HB | >150 | HB | >150 |
| Comparative example 24 | 100 | | 10 | PC:20 | HB | >150 | HB | >150 |
| Comparative example 25 | 100 | | 10 | | HB | >150 | HB | >150 |
| Comparative example 26 | 100 | | 10 | PA6:20 | HB | >150 | HB | >150 |

| | Properties | | | |
|---|---|---|---|---|
| | Impact resistance, heat resistance and flowability | | | |
| | Wet heat resistance Bleed-out | 1/2" impact resistance (J/m) | Load deflection temperature (1.8 MPa, C) | Flowability, MFR |
| Example 37 | ⊚ | 117 | 87 | 42 |
| Example 38 | ⊚ | 140 | 93 | 48 |
| Example 39 | ⊚ | 145 | 94 | 48 |
| Comparative example 23 | X | 77 | 58 | 18 |
| Comparative example 24 | X | 24 | 85 | 12 |
| Comparative example 25 | Δ | 40 | 85 | 42 |
| Comparative example 26 | Δ | 100 | 80 | 40 |

From the measured results of Examples 37 through 39 and Comparative Examples 23 through 26, it can be seen that if PET and red phosphorus are added to ABS, resin compositions as excellent as V-0 at 1/16" or V-2 at 1/32", excellent in wet heat resistance and good in impact resistance and flowability at the time of molding can be obtained. Furthermore, from Example 39, it can be seen that if a fluorine based resin is added, a thin molding (1/32") excellent in flame retardancy can be obtained.

On the other hand, from Comparative Example 25, it can be seen that if red phosphorus only is added to an ABS resin, the resin cannot be made flame retardant, and from Comparative Examples 24 and 26, it can be seen that even if PC or PA6 is added in addition to PET, the resin obtained cannot be made flame retardant and is also low bleed resistance and other properties. From Comparative Example 23, it can be seen that even if an aromatic phosphate and PC are added instead of red phosphorus, the resin obtained cannot be made flame retardant and remarkably declines in bleed resistance and load deflection temperature.

Example 40

Fifty parts by weight of red phosphorus ("Novaexell" 140 produced by Rinkagaku Kogyo) were mixed with 100 parts of an ethylene terephthalate copolymer with terephthalic acid used as a dicarboxylic acid component, and with ethylene glycol and cyclohexanedimethanol used at a molar ratio of 70/30, "Easter" GN002 (produced by Eastman Kodak), and under nitrogen flow, the mixture was melt-extruded at a resin temperature of 230° C. using a coaxially rotating double-screw extruder of 30 mm in screw diameter and 45.5 in L/D (TEX-30 produced by Japan Steel Works, Ltd.), to produce a composition high in red phosphorus content. The polyethylene terephthalate copolymer composition high in red phosphorus content was used for extruding and molding a resin composition as described in the above examples. The results are shown in Table 9.

From comparison between Examples 38 and 40, it can be seen that the use of a composition high in red phosphorus content allows the burning time to be further shortened and the mechanical property to be further enhanced.

TABLE 9

| | Resin composition (parts by weight) | | | | Properties | | | | | | | |
|---|---|---|---|---|---|---|---|---|---|---|---|---|
| | | | PET copolymer composition | | Flame retardancy | | | | | Impact resistance, heat resistance and flowability | | |
| | | | | | UL-94 1/16" | | UL-94 1/32" | | | 1/2" | Load | |
| Table 9 | ABS | PET co-polymer | high in red phosphorus content (50%) | Other additive | Flame retardancy | Burning time (seconds) | Flame retardancy | Burning time (seconds) | Wet heat resistance Bleed-out | impact resistance (J/m) | deflection temperature (1.8 MPa, C) | Flow-ability, MFR |
| Example 40 | 100 | 10 | 20 (Red phosphorus: 10) Fluorine based resin | Fluorine based resin:0.25 | V-0 | 12 | V-0 | 20 | ⊚ | 152 | 94 | 55 |

The parenthesized numerals show the red phosphorus content and the resin content of each composition high in red phosphorus content.

Making a Liquid Crystal Polyester Flame Retardant

Examples 41 Through 49 and Comparative Examples 27 Through 33

The liquid crystal polyester used in these examples was produced according to the following method.

Reference Example 1

Nine hundred and ninety four parts by weight of p-hydroxybenzoic acid, 126 parts by weight of 4,4'-

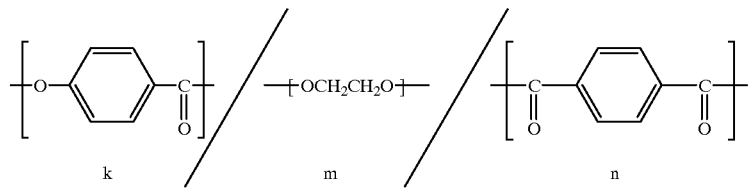

dihyroxybiphenyl, 112 parts by weight of terephthalic acid, 216 parts by weight of polyethylene terephthalate of 0.6 dl/g in intrinsic viscosity and 960 parts by weight of acetic anhydride were supplied into a reactor equipped with stirring blades and a distilling-out tube, and polymerization to remove acetic acid was effected according to the following conditions.

In nitrogen gas atmosphere, reaction was carried out at 100 to 250° C. for 5 hours and at 250 to 300° C. for 15 hours, and the pressure was reduced to 0.5 mm Hg at 315° C., taking 1 hour. Reaction was further carried out for 1.25 hours to complete the polycondensation. An almost theoretical amount of acetic acid was distilled out, and a thermoplastic resin (liquid crystal polyester) (B-1) with the following theoretical structural formula was obtained.
[Chemical formula 18]

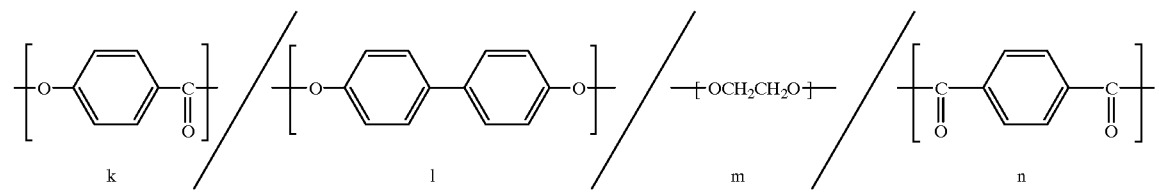

k/l/m/n=80/7.5/12.5/20 (molar ratio) (B-1)

The liquid crystal polyester was placed on the specimen carrier of a polarizing microscope and heated to confirm its optical isotropy. As a result, the liquid crystal initiation temperature was found to be 293° C., to show good optical anisotropy. The melting point (Tm) was 314° C.

The inherent viscosity of the liquid crystal polyester (measured in pentafluorophenol at a concentration of 0.1 g/dl at 60° C.) was 1.98 dl/g, and the melt viscosity at 324° C. at a shear rate of 1000 seconds was 780 poises.

Reference Example 2

For comparison with the liquid crystal polyester of the present invention, a liquid crystal polyester consisting of polyethylene terephthalate containing no structural component (II) and p-acetoxybenzoic acid was synthesized according to the method described in Japanese Patent Laid-Open (Kokai) No. 7-299050. That is, the polyethylene terephthalate and p-acetoxybenzoic acid were molten and mixed to effect acidolysis reaction, for forming polyester fragments, and under reduced pressure, polycondensation reaction was effected to increase the molecular weight, for obtaining a liquid crystal polyester with the following structure (B-2).

[Chemical formula 19]
k/m/n=80/20/20 (molar ratio) (B-2)

Red phosphorus ("Novaexell" 140) produced by Rinkagaku Kogyo or red phosphorus ("Novaexell" F5, 4.5μ in average grain size and 200 μm/cm in electric conductivity) produced by Rinkagaku Kogyo or red phosphorus ("Novared" 120, 24.7μ in average grain size and 1500 μm/S in electric conductivity) produced by Rinkagaku Kogyo, glass fibers and other additives were blended at a ratio shown in Table 10 with 100 parts by weight of the crystal liquid polyester of Reference Example 1 or 2, and under nitrogen flow, the mixture was melt-kneaded at 310° C. using a double-screw extruder of 30 mm in diameter, to obtain pellets. The pellets were molded using Sumitomo Nestal injection molding machine, Promat 40/25 (produced by Sumitomo Heavy Industries, Ltd.) at a cylinder temperature of 310° C. at a mold temperature of 90° C., to obtain specimens. The crystal liquid polyester resin compositions were evaluated in flame retardancy, mechanical property (tensile strength), wet heat resistance (bleed-out), heat resistance (load deflection temperature) and flowability (flow length) according to the following methods. Since they were not so different in the decline of strength, the bleed-out property was used as a wet heat resistance indicator.

(1) Flame retardancy

Burning specimens (0.5 mm×12.7 mm×127 mm) were used for a burning test according to UL94.

(2) Tensile strength

ASTM No. 1 dumbbell specimens were molded and measured according to ASTM D 638.

(3) Color tone

Tensile test specimens were used for measuring the redness (value a) using an SM color computer produced by Suga Shikenki K.K.

(4) Load deflection temperature

Measured at a load of 1.8 MPa according to ASTM D 648.

(5) Flowability

The molding flowability was obtained by measuring the flow length (rod flow length) of a specimen of 0.5 mm in thickness and 12.7 mm in width using the above molding machine at a cylinder temperature of melting point+10° C., at a mold temperature of 90° C., at an injection speed of 99% and at an injection pressure of 500 kgf/cm².

Mixing ratios and results are shown in Table 10.

TABLE 10

| | Resin composition (parts by weight) | | | | Properties | | |
|---|---|---|---|---|---|---|---|
| | Liquid crystal polyester (100 parts by weight) | Red phosphorus | Amount added | Amount of glass fibers added (parts by weight) | Flame retardancy | | |
| Table 10 | | | | | Flame retardancy, 0.5 mm thick, UL94 | Burning time (seconds) | Wet heat resistance (MPa) Bleed-out |
| Example 41 | B-1 | "Novaexell"140 | 0.1 | 45 | V-0 | 26 | ⊚ |
| Example 42 | B-1 | "Novaexell"140 | 0.15 | 45 | V-0 | 23 | ⊚ |
| Example 43 | B-1 | "Novaexell"140 | 0.2 | 45 | V-0 | 16 | ⊚ |
| Example 44 | B-1 | "Novaexell"F5 | 0.1 | 45 | V-0 | 26 | ⊚ |
| Example 45 | B-1 | "Novaexell"F5 | 0.15 | 45 | V-0 | 23 | ⊚ |
| Example 46 | B-1 | "Novaexell"F5 | 0.2 | 45 | V-0 | 16 | ⊚ |
| Example 47 | B-1 | "Novaexell"120 | 0.1 | 45 | V-0 | 26 | ⊚ |
| Example 48 | B-1 | "Novaexell"140 | 0.3 | 45 | V-0 | 13 | ⊚ |
| Example 49 | B-1 | "Novaexell"F5 | 0.3 | 45 | V-0 | 13 | ⊚ |
| Comparative Example 27 | B-2 | "Novaexell"140 | 0.1 | 45 | V-2 | 65 | Δ |
| Comparative Example 28 | B-2 | "Novaexell"140 | 1.0 | 45 | V-1 | 61 | Δ |
| Comparative Example 29 | B-2 | "Novaexell"140 | 2.0 | 45 | V-0 | 48 | Δ |
| Comparative Example 30 | B-2 | "Novaexell"F5 | 0.1 | 45 | V-2 | 65 | Δ |
| Comparative Example 31 | B-2 | "Novaered"120 | 0.2 | 45 | V-1 | 61 | X |
| Comparative Example 32 | B-2 | "Novaered"120 | 1.0 | 45 | V-1 | 60 | X |
| Comparative Example 33 | B-2 | "Novaered"120 | 0.0 | 45 | V-1 | 60 | X |

| | Strength, color tone, flowability and heat resistance | | | |
|---|---|---|---|---|
| | Tensile strength (MPa) | Color tone, value a | Flowability, flow length (mm) | Load deflection temperature (1.82 MPa, C) |
| Example 41 | 149 | 4.0 | 150 | 254 |
| Example 42 | 149 | 4.2 | 148 | 253 |
| Example 43 | 148 | 5.0 | 146 | 253 |
| Example 44 | 149 | 3.8 | 151 | 255 |
| Example 45 | 149 | 4.0 | 149 | 254 |
| Example 46 | 148 | 4.8 | 147 | 253 |
| Example 47 | 149 | 4.0 | 150 | 254 |
| Example 48 | 147 | 6.0 | 146 | 253 |
| Example 49 | 148 | 5.5 | 147 | 253 |
| Comparative Example 27 | 131 | 4.0 | 120 | 205 |
| Comparative Example 28 | 120 | 30.0 | 110 | 203 |
| Comparative Example 29 | 115 | 50.0 | 105 | 200 |
| Comparative Example 30 | 131 | 4.5 | 116 | 205 |
| Comparative Example 31 | 130 | 5.0 | 116 | 205 |
| Comparative Example 32 | 111 | 32.0 | 100 | 200 |
| Comparative Example 33 | 111 | 32.0 | 100 | 200 |

TABLE 11

| | Resin composition (parts by weight) | | | | | | Properties |
|---|---|---|---|---|---|---|---|
| Table 11 | Liquid crystal polyester (100 parts by weight) | Red phosphorus | Amount added | Amount of glass fibers added (parts by weight) | Metal oxide Kind | Flame retardancy Parts by weight | Wet heat resistance (MPa) Flame retardancy, 0.5 mm thick, UL94 |
| Example 41 | B-1 | "Novaexell"140 | 0.3 | 45 | CuO | 1.0 | V-0 |
| Example 42 | B-1 | "Novaexell"140 | 0.3 | 45 | — | — | V-0 |
| Example 43 | B-1 | "Novaexell"140 | 0.3 | 45 | TiO | 1.0 | V-0 |
| Example 44 | B-1 | "Novaexell"140 | 0.3 | 45 | TiO | 1.0 | V-0 |

TABLE 11-continued

Strength, color tone, flowability and heat resistance

|  | Burning time (seconds) | Bleed-out | Tensile strength (MPa) | Color tone, value a | Flowability, flow length (mm) | Load deflection temperature (1.82 MPa, C) |
|---|---|---|---|---|---|---|
| Example 41 | 11 | ⊚ | 151 | 5.0 | 150 | 254 |
| Example 42 | 13 | ⊚ | 152 | 5.2 | 148 | 253 |
| Example 43 | 11 | ⊚ | 151 | 3.0 | 146 | 255 |
| Example 44 | 20 | ⊚ | 153 | 2.0 | 151 | 253 |

From the results of Examples 41 through 49, it can be seen that when 100 parts by weight of the liquid crystal polyester (B) consisting of the structural components (I), (II), (III) and (IV) and 0.1 to 0.3 part by weight of red phosphorus (C) of the present invention are mixed, a molding specifically excellent in flame retardancy, excellent in mechanical property and wet heat resistance and also excellent in heat resistance, flowability and coloration resistance can be obtained. On the other hand, from the results of Comparative Examples 27 through 33, it can be seen that if a liquid crystal polyester consisting of structural components (I), (III) and (IV) not in conformity with the present invention is used, the flame retarding effect obtained with red phosphorus added is small, and that even if the amount is increased to 2.0 parts by weight, the mechanical property, wet heat resistance and heat resistance are poor while the flowability and coloration resistance decline remarkably though the flame retardancy can be secured (Comparative Example 29).

In Examples 50 through 53, cuprous oxide or titanium oxide was further added as a metal oxide, and it can be seen that the burning time could be shortened while coloration resistance could be enhanced.

Example 54

Twenty five parts by weight of red phosphorus ("Novaexell" 140) produced by Rinkagaku Kogyo were added to 100 parts by weight of the liquid crystal polyester produced in Reference Example 1, and under nitrogen flow, the mixture was melt-kneaded using a double-screw extruder of 30 mm in diameter at 310° C., to produce a liquid crystal polyester composition high in red phosphorus content. The composition high in red phosphorus content was used to extrude and mold a resin composition as described in the above examples. The results are shown in Table 12.

If can be seen that the use of a composition high in red phosphorus content allows the burning time to be further shortened, the mechanical property to be improved and the coloration resistance to be remarkably improved.

TABLE 12

| | Resin composition (parts by weight) | | | | Properties | | | | | | |
|---|---|---|---|---|---|---|---|---|---|---|---|
| | | | "Novaexell"140 | | Flame retardancy | | | Strength, color tone, flowability and heat resistance | | | |
| Table 12 | Liquid crystal polyester | Amount added | composition high in red phosphorus content (25%) | Amount of glass fibers (parts by weight) | Flame retardancy, 0.5 mm thick, UL94 | Burning time (seconds) | Wet heat resistance Bleed-out | Tensile strength (MPa) | Color tone, value a | Flowability, flow length (mm) | Load deflection temperature (1.82 MPa, C) |
| Example 54 | B-1 | 99.7 | 50 (Red phosphorus: 0.1) (Liquid crystal polyester:0.3) | 45 | V-0 | 16 | ⊚ | 153 | 3.0 | 160 | 254 |

The parenthesized numerals show the red phosphorus content and the resin content of each composition high in red phosphorus content.

Example 55

Two parts by weight of red phosphorus ("Novaexell" 140) produced by Rinkagaku Kogyo and 20 parts by weight of titanium oxide mixed as powders beforehand by a Henschel mixer in nitrogen atmosphere were added to 100 parts by weight of the liquid crystal polyester produced in Reference Example 1, and under nitrogen flow, the mixture was melt-kneaded using a double-screw extruder of 30 mm in diameter at 310° C., to produce a liquid crystal polyester composition high in red phosphorus content and titanium oxide content. The composition high in red phosphorus content and titanium oxide content was used for extruding and molding a resin composition as described in the above examples. The results are shown in Table 13.

It can be seen that the use of a composition high in red phosphorus content allows the burning time to be further shortened, the mechanical property to be improved and the coloration resistance to be remarkably improved. Furthermore, the use of a composition high in red phosphorus content and titanium oxide content allows the coloration resistance to be remarkably improved.

TABLE 13

| | Resin composition (parts by weight) | | | | Properties | | | | | | |
|---|---|---|---|---|---|---|---|---|---|---|---|
| | | | "Novaexell"140 composition | | Flame retardancy | | | Strength, color tone, flowability and heat resistance | | | |
| Table 13 | Liquid crystal polyester | Amount added | containing 2% of red phosphorus and 20% of titanium oxide | Amount of glass fibers (parts by weight) | Flame retardancy, 0.5 mm thick, UL94 | Burning time (seconds) | Wet heat resistance Bleed-out | Tensile strength (MPa) | Color tone, value a | Flowability, flow length (mm) | Load deflection temperature (1.82 MPa, C) |
| Example 55 | B-1 | 96.1 | 550 (Red phosphorus:0.1) 20. (Titanium oxide:1.0) 21. (Liquid crystal polyester:3.9) | 45 | V-0 | 15 | ◎ | 155 | 1.0 | 160 | 254 |

The parenthesized numerals show the red phosphorus content and the resin content of each composition high in red phosphorus content.

Examples 56 and 57

A composition high in red phosphorus content was used for extruding and molding a resin composition as described in the Example 10. The results are shown in Table 14.

It can be seen by comparison with Examples 56, 57 and the Comparative Examples 9 and 10 that the use of a composition high in red phosphorus content allows the flame retardancy, the wet heat resistance and the mechanical property to be improved, even if the total amount of polyethylene terephthalate is 68 parts by weight.

TABLE 14

| | Resin Composition (parts by weight) | | | | | | | | Properties | | | | | |
|---|---|---|---|---|---|---|---|---|---|---|---|---|---|---|
| | | | Composition | | | | | | Flame Retardancy | | | | Wet heat resistancy | Mechanical |
| | | | high | | Fluoride | | | | UL-94 1/16" | | UL-94 1/32" | | | Tensile Property |
| Table 14 | PBT | PET | in red phosphorus content (50%) | Glass Fiber | based resin | Cyanurate | Metal oxide | Stabilizer | Flame retardancy | Burning time (seconds) | Flame retardancy | Burning time (seconds) | Bleed-out | strength holding rate (%) | Tensile Strength (MPa) |
| Example 56 | 100 | 53 | 30 (Red (phosphorous:15) PET:15) | — | 0.5 | 5 | 0.5 | 0.2 | V-0 | 30 | V-1 | 60 | ○ | 82 | 55 |
| Example 57 | 100 | 53 | 30 (Red phosphorus:15) (PET:15) | 80 | 0.5 | 5 | 0.5 | 0.2 | V-0 | 15 | V-0 | 48 | ○ | 55 | 145 |

What is claimed is:

1. A flame retardant resin composition, comprising 100 parts by weight of the following component (A) and 0.01 to 20 parts by weight of red phosphorus (C) covered with a thermosetting resin or 100 parts by weight of the following component (B) and 0.01 to 0.1 parts by weight of red phosphorus (C):

(A) (a1) 67 to 99.99 wt % (based on the total weight of (a1) and (a2)) of a thermoplastic resin other than polyethylene terephthalate and ethylene terephthalate copolymers and (a2) 33 to 0.01 wt % (based on the total weight of (a1) and (a2)) of polyethylene terephthalate and/or an ethylene terephthalate copolymer or (B) a thermoplastic resin consisting of the following structural components (I), (II), (III) and (IV):

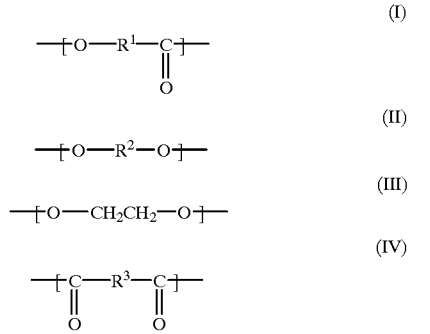

where R1, R2 and R3 stand for, respectively independently, a divalent aromatic residue.

2. A flame retardant resin composition, comprising:
(a1) 100 parts by weight of a thermoplastic resin other than polyethylene terephthalate and ethylene terephthalate copolymers,
(a2) 0.01 to 50 parts by weight of polyethylene terephthalate and/or an ethylene terephthalate copolymer, and
(C) 0.1 to 20 parts by weight of red phosphorus covered with a thermosetting resin.

3. A flame retardant resin composition, comprising 100 parts by weight of a thermoplastic resin consisting of the following structural components (I), (II), (III) and (IV) and 0.01 to 0.1 parts by weight of red phosphorus (C)
[Chemical formula 2]

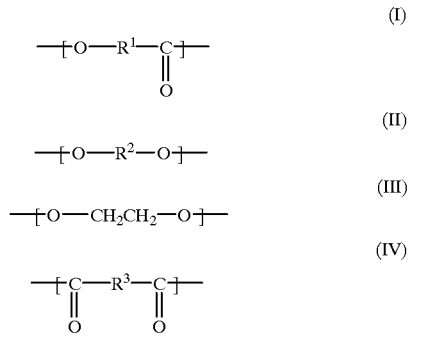

where R1, R2 and R3 stand for, respectively independently, a divalent aromatic residue.

4. A flame retardant resin composition, according to claim 3, wherein the thermoplastic resin (B) contains the structural components (I) and (II) by 77 to 93 mol % in total based on the total amount of the structural components (I), (II) and (III), the structural component (III) by 23 to 7 mol % based on the total amount of the structural components (I), (II) and (III), and the structural component (IV) by an amount substantially equal in moles to the total amount of the structural components (II) and (III).

5. A flame retardant resin composition, according to claim 1, wherein the thermoplastic resin (a1) other than polyethylene terephthalate and ethylene terephthalate copolymers is polybutylene terephthalate.

6. A flame retardant resin composition, according to claim 1, wherein the thermoplastic resin (a1) other than polyethylene terephthalate and ethylene terephthalate copolymers is a polyamide.

7. A flame retardant resin composition, according to claim 6, wherein the polyamide is one or more selected from nylon 6, nylon 66 and their copolymer.

8. A flame retardant resin composition, according to claim 1, wherein the thermoplastic resin (a1) other than polyethylene terephthalate and ethylene terephthalate copolymers is a styrene based resin.

9. A flame retardant resin composition, according to claim 1, wherein the electric conductivity of red phosphorus is 0.1 to 1000 $\mu$S/cm, (The electric conductivity refers to the electric conductivity of the extract obtained by adding 100 ml of pure water to 5 g of red phosphorus, treating the mixture at 121° C. for 100 hours, filtering away red phosphorus, and diluting the filtrate to 25° ml.)

10. A flame retardant resin composition, according to claim 1, wherein a metal oxide is further contained.

11. A flame retardant resin composition, according to claim 10, wherein the metal oxide is one or more selected from cadmium oxide, zinc oxide, cuprous oxide, cupric oxide, ferrous oxide, ferric oxide, cobalt oxide, manganese oxide, molybdenum oxide, tin oxide and titanium oxide.

12. A flame retardant resin composition, according to claim 11, wherein the metal oxide is cuprous oxide, cupric oxide or titanium oxide.

13. A flame retardant resin composition, according to claim 1, wherein a filler is further contained.

14. A flame retardant resin composition, according to claim 13, wherein the filler is glass fibers.

15. A flame retardant resin composition, according to claim 1, wherein a fluorine based resin is further contained.

16. A flame retardant resin composition, according to claim 1, wherein a hindered phenol based stabilizer is further contained.

17. A flame retardant resin composition, according to claim 1, wherein a salt formed by a triazine based compound and a cyanuric acid or isocyanuric acid is further contained.

18. A molding comprising a flame retardant resin composition consisting of 100 parts by weight of the following component (A) and 0.01 to 20 parts by weight of red phosphorus (C) covered with a thermosetting resin or 100 parts by weight of the following component (B) and 0.01 to 0.1 parts by weight of red phosphorus (C): (A) (a1) 67 to 99.99 wt % (based on the total weight of (a1) and (a2)) of a thermoplastic resin other than polyethylene terephthalate and ethylene terephthalate copolymers and (a2) 33 to 0.01 wt % (based on the total weight of (a1) and (a2)) of polyethylene terephthalate and/or an ethylene terephthalate copolymer (B) a thermoplastic resin consisting of the following structural components (I), (II), (III) and (IV):

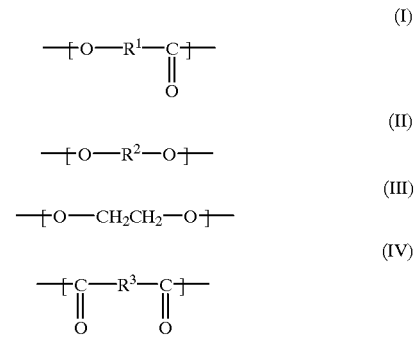

where R1, R2 and R3 stand for, respectively independently, a divalent aromatic residue.

19. A molding, according to claim 18, wherein the molding is selected from mechanical parts, electric and electronic parts, automobile parts, office automation apparatus housings, household electric appliance housings, office automation apparatus parts, and household electric appliance parts.

20. A process for producing a flame retardant resin composition, comprising the steps of melt-kneading part of the following component (A) or (B) and red phosphorus (C), to produce a composition high in red phosphorus content (1), and melt-kneading the remaining amount of the component (A) or (B) and the composition high in red phosphorus content (1) by a double-screw extruder:

(A) (a1) 67 to 99.99 wt % (based on the total weight of (a1) and (a2)) of a thermoplastic resin other than polyethylene terephthalate and ethylene terephthalate copolymers and (a2) 33 to 0.01 wt % (based on the total weight of (a1) and (a2)) of polyethylene terephthalate and/or an ethylene terephthalate copolymer (B) a thermoplastic resin consisting of the following structural components (I) (II), (III) and (IV):

Chemical formula 4

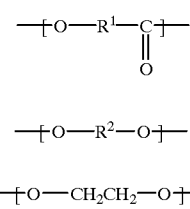

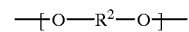

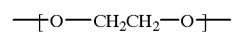

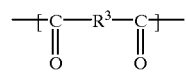

where R1, R2 and R3 stand for, respectively independently, a divalent aromatic residue.

21. A flame retardant agent for resins, comprising (a2) 100 parts by weight of polyethylene terephthalate and/or an ethylene terephthalate copolymer and (C) 0.01 to 250 parts by weight of red phosphorus.

22. A flame retardant resin composition, comprising
(a1) 100 parts by weight of polybutylene-terephthalate,
(a2) 0.01 to 68 parts by weight of polyethylene terephthalate and/or an ethylene terephthalate copolymer, and
(C) 0.1 to 20 parts by weight of red phosphorus covered with a thermosetting resin.

23. A molding, comprising a flame retardant resin composition, comprising
(a1) 100 parts by weight of polybutylene terephthalate,
(a2) 0.01 to 68 parts by weight of polyethylene terephthalate and/or an ethylene terephthalate copolymer, and
(C) 0.1 to 20 parts by weight of red phosphorus covered with a thermosetting resin.

24. A molding, according to claim 23, wherein the molding is selected from mechanical parts, electric and electronic parts, automobile parts, office automation apparatus housings, household electric appliance housings, office automation apparatus parts, and household electric appliance parts.

* * * * *

UNITED STATES PATENT AND TRADEMARK OFFICE
CERTIFICATE OF CORRECTION

PATENT NO. : 6,136,892
DATED : October 24, 2000
INVENTOR(S) : Yamauchi, et. al.

It is certified that error appears in the above-identified patent and that said Letters Patent is hereby corrected as shown below:

In Column 37, at Table 10, at "Comparative Example 33", at the subheading "Amount added", please change "0.0" to --1.0--.

Signed and Sealed this

First Day of May, 2001

Attest:

NICHOLAS P. GODICI

Attesting Officer      Acting Director of the United States Patent and Trademark Office